(12) United States Patent
Mushynski et al.

(10) Patent No.: US 10,589,944 B2
(45) Date of Patent: Mar. 17, 2020

(54) VEHICLE RESTRAINTS WITH A BARRIER HAVING ROTATIONAL AND TRANSLATIONAL MOTION

(71) Applicant: Rite-Hite Holding Corporation, Milwaukee, WI (US)

(72) Inventors: Alan Mushynski, Brookfield, WI (US); Bradley J. Stone, Port Washington, WI (US); Leonard Kikstra, Jackson, WI (US); Matthew Sveum, Wauwatosa, WI (US); Robert J. Harter, LaCrosse, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 15/907,021

(22) Filed: Feb. 27, 2018

(65) Prior Publication Data
US 2019/0263607 A1    Aug. 29, 2019

(51) Int. Cl.
*B65G 69/22* (2006.01)
*B65G 69/00* (2006.01)
(Continued)

(52) U.S. Cl.
CPC ............ *B65G 69/003* (2013.01); *B65G 67/54* (2013.01); *B65G 69/22* (2013.01); *B65G 69/2888* (2013.01)

(58) Field of Classification Search
CPC .................................................. B65G 69/003
See application file for complete search history.

(56) References Cited

U.S. PATENT DOCUMENTS

| 4,379,354 A | 4/1983 | Hahn et al. |
| 4,555,211 A | 11/1985 | Metz |

(Continued)

FOREIGN PATENT DOCUMENTS

| EP | 2407399 | 1/2012 |
| EP | 2902347 | 8/2015 |

(Continued)

OTHER PUBLICATIONS

International Searching Authority, "International Search Report," issued in connection with International Patent Application No. PCT/US2019/019416, dated Aug. 27, 2019, 8 pages.

(Continued)

*Primary Examiner* — Jonathan Snelting
(74) *Attorney, Agent, or Firm* — Hanley, Flight & Zimmerman, LLC

(57) ABSTRACT

Example vehicle restraints with a barrier having rotational and translational motion are described. An example vehicle restraint includes a carriage frame movable vertically relative to the dock. A drive shaft is supported by the carriage frame. A drive unit is to rotate the drive shaft about a shaft axis and relative to the carriage frame. A hub is connected to rotate with the drive shaft about the shaft axis, the hub having an outer diameter surface that is radially off center relative to the shaft axis. A barrier defines a bore that encircles the outer diameter surface of the hub. The barrier is movable selectively to an extended position and a retracted position. The barrier being connected to move selectively to the extended position and the retracted position in response to relative rotation between the outer diameter surface of the hub and the bore of the barrier.

26 Claims, 38 Drawing Sheets

(51) Int. Cl.
*B65G 67/54* (2006.01)
*B65G 69/28* (2006.01)

(56) References Cited

U.S. PATENT DOCUMENTS

| | | | | |
|---|---|---|---|---|
| 4,915,568 A * | 4/1990 | West | ................... | B65G 69/003 14/71.1 |
| 5,071,306 A | 12/1991 | Alexander | | |
| 6,431,819 B1 * | 8/2002 | Hahn | ................... | B65G 69/003 414/401 |
| 7,146,673 B1 * | 12/2006 | Digmann | ............. | B65G 69/003 14/71.5 |
| 8,616,826 B2 * | 12/2013 | Cotton | ................ | B65G 69/003 414/401 |
| 9,145,273 B2 * | 9/2015 | Brooks | ................ | B65G 69/003 |
| 9,272,854 B2 * | 3/2016 | Lessard | .................. | B65G 69/28 |
| 9,428,349 B2 * | 8/2016 | Muhl | ...................... | F16H 21/26 |
| 2017/0144847 A1 | 5/2017 | Gadbois et al. | | |
| 2019/0009999 A1 * | 1/2019 | Schlintz | ............... | B65G 69/003 |

FOREIGN PATENT DOCUMENTS

| | | |
|---|---|---|
| WO | 2013009960 | 1/2013 |
| WO | 2014035727 | 3/2014 |

OTHER PUBLICATIONS

International Searching Authority, "Written Opinion" issued in connection with International Patent Application No. PCT/US2019/019416, dated Aug. 27, 2019, 18 pages.

* cited by examiner

VEHICLE RESTRAINTS WITH A BARRIER HAVING ROTATIONAL AND TRANSLATIONAL MOTION

FIELD OF THE DISCLOSURE

This disclosure relates generally to vehicle restraints for use at loading docks and, more particularly, to vehicle restraints with a barrier having rotational and translational motion.

BACKGROUND

When loading or unloading a vehicle (e.g., a truck, trailer, etc.) parked at a loading dock, a hook-style vehicle restraint may be employed to restrain the vehicle and prevent or restrict the vehicle from accidentally moving too far away from the dock during loading and/or unloading operations. To restrain the vehicle, a hook-style vehicle restraint engages what is often referred to in the industry as a vehicle's ICC bar (Interstate Commerce Commission bar) or RIG (Rear Impact Guard). An ICC bar or RIG includes a bar or beam that extends horizontally across the rear of a vehicle, below the bed of the truck or trailer. Its primary purpose is to help prevent an automobile from under-riding the vehicle in a rear-end collision. A RIG, however, also provides a structure for a hook-style restraint to extend around in order to obstruct the bar's and thereby the vehicle's movement away from the dock during loading and unloading operations.

To release the vehicle and allow it to drive away from the dock, the restraint is moved to a position in which it does not obstruct the movement of the bar. Sometimes, however, forward pressure from the vehicle causes the restraint's hook to catch on the bar in a way that prevents the hook from disengaging the ICC bar. Such a condition is remedied by what's known as a "bump-back," where the vehicle backs up slightly toward the dock to release the pressure on the restraint and thus allow the hook to disengage from the ICC bar. Once the hook is no longer obstructing the vehicle's movement, the vehicle is free to drive away from the dock.

DETAILED DESCRIPTION

Example vehicle restraints for use at a loading dock for selectively blocking and releasing a vehicle (e.g., by engagement and disengagement with a rear impact guard of the vehicle) are disclosed herein. In some examples, example vehicle restraints disclosed herein includes a (e.g., hook-shaped) barrier that rotates selectively between at least a stored position, a fully raised position and a partially raised position. Example barriers disclosed herein can rotate in a first direction (e.g., in an upward direction) to block or engage a vehicle (e.g., a rear impact guard of a vehicle) and a second direction (e.g., in a downward direction) opposite the first direction to release or disengage the vehicle (e.g., the rear impact guard of the vehicle). Additionally, example barriers disclosed herein can translate or shift laterally (e.g., horizontally or a linear direction) between a retracted position and an extended position. For example, when rotating a barrier to the stored position (e.g., a fully stored position), the example barrier disclosed herein translates in a direction away from the vehicle (e.g., the rear impact guard or other structure).

For example, an example barrier disclosed herein can laterally shift in a forward direction (e.g., away from a loading dock wall) to relieve, release or reduce a forward pressure or force that a vehicle might exert against the barrier during loading/and/or unloading operations when the vehicle is restrained by the barrier. Thus, an example barrier disclosed herein translate (e.g., away from the rear impact guard) to release the vehicle (e.g., the rear impact guard) and move or rotate the example barrier to the stored position. In some examples, springs and/or bearings ensure proper or optimal operation of the vehicle restraint. In some examples, certain parts are configured to prevent or reduce (e.g., minimize) adverse rotational inertia or friction forces (e.g., that may be imparted to the vehicle restraint during movement of the barrier). Such example barriers disclosed herein eliminate the need for bump back to release a vehicle (e.g., requiring the vehicle to move back toward the loading dock to release the forces and enable the barrier to rotate to a stored position).

Figure 2:
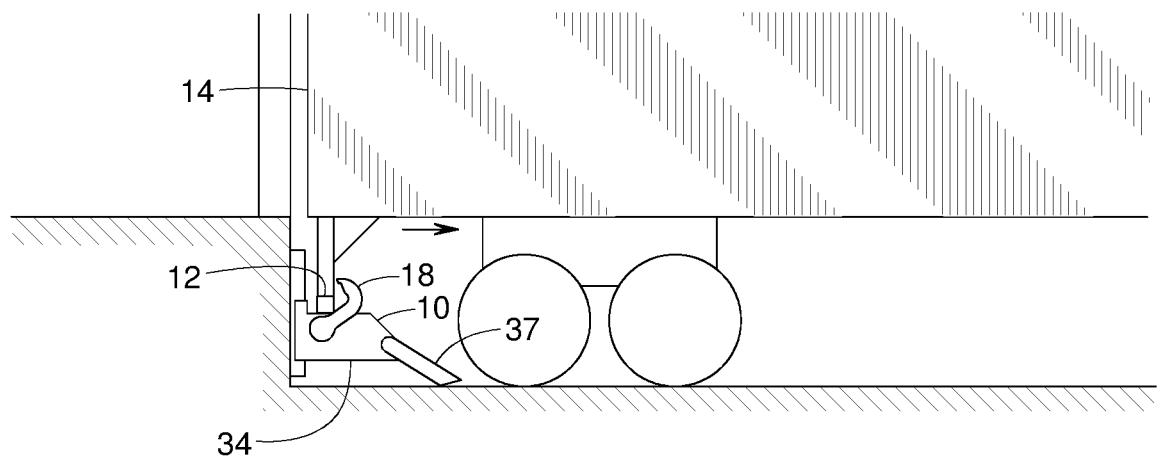
FIG. 2 is a side view similar to FIG. 1 but showing an example barrier of the vehicle restraint in a fully raised, deployed position capturing the vehicle's rear impact guard.
Figure 3:
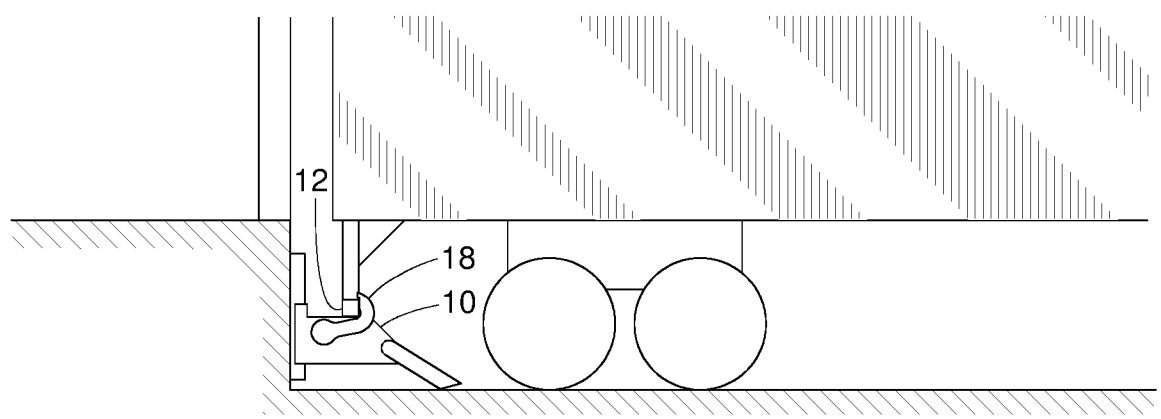
FIG. 3 is a side view similar to FIG. 2 but showing the vehicle having moved slightly forward and the example barrier in a partially raised, deployed position.

FIGS. 1-36 show various example vehicle restraints 10 (e.g., vehicle restraints 10a-10i) for blocking and releasing a rear impact guard 12 of a vehicle 14 (e.g., a truck, a trailer, etc.) at a loading dock 16. In some examples, the vehicle restraints 10 include a hook-shaped barrier 18 that rotates selectively to a stored position (FIG. 1), a fully raised, deployed position (FIG. 2), and a partially raised, deployed position (FIG. 3). For the purposes of this description, "stored" indicates a condition in which the barrier is rotationally positioned such that a vehicle is able to freely exit the vehicle restraint and "deployed" indicates a condition in which the barrier is rotationally positioned such that a vehicle is restricted from freely exiting the vehicle restraint.

Figure 1:
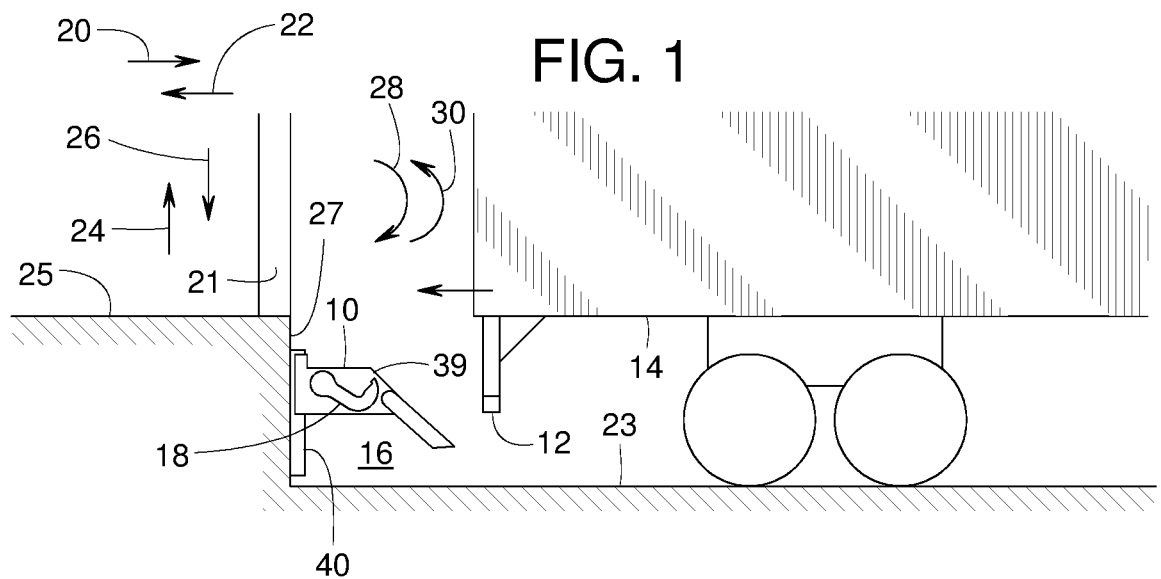
FIG. 1 is a side view of an example vehicle backing into an example dock that includes an example vehicle restraint constructed in accordance with teachings disclosed herein in a stored position.

For spatial reference, arrow 20 of FIG. 1 represents a first lateral or forward direction, arrow 22 represents a second lateral or rearward direction, arrow 24 represents an upward direction, arrow 26 represents a downward direction, arrow 28 represents a first rotational or clockwise direction, and arrow 30 represents a second rotational or counterclockwise direction. Arrow 32 of FIG. 16 represents an axial direction.

The barrier 18 rotates in the counterclockwise direction 30 (e.g., upward in the orientation of FIGS. 1-36) to block or engage the rear impact guard 12 and rotates in the clockwise direction 28 (e.g., downward in the orientation of FIGS. 1-36) to release the rear impact guard 12. The barrier 18 also translates or shifts (e.g., in a horizontal or linear direction) between an extended position (e.g., FIGS. 4 and 13) and a retracted position (e.g., FIGS. 5 and 10). For purposes of this description, "extended" refers to a condition in which the barrier is in a relatively forward lateral position (given a particular rotational position) and "retracted" refers to a condition in which the barrier is in a relatively rearward lateral position (in substantially the same rotational position). In some examples, the barrier 18 shifts laterally in the forward direction 20 (from a retracted to an extended position) to release forward pressure from vehicle 14 that the barrier 18 might experience.

FIG. 1 shows the vehicle 14 backing into the dock 16. In some examples, the dock 16 includes a doorway 21, a driveway 23, a platform 25, and a forward-facing wall 27 extending between the platform 25 and the driveway 23. FIG. 2 shows the vehicle's rear impact guard 12 resting atop the vehicle restraint's carriage frame 34 after the vehicle 14 moved rearward causing its rear impact guard 12 to slide back along the restraint's pivotal lead-in guide 37 and an inclined edge 39 of the carriage frame 34. In some examples, the carriage frame 34 is spring biased upward to the position shown in FIG. 1. In opposition to the upward spring force, the rear impact guard 12 sliding back along lead-in guide 37 and inclined edge 39 pushes the carriage frame 34 down along a track 40 mounted to the dock 16. Once the rear impact guard 12 is (e.g., squarely) on top of the carriage frame 34, the barrier 18 rotates in an upward direction to capture or engage the rear impact guard 12, as shown in FIG. 2. In some examples, if the vehicle 14 attempts to move forward or experiences net forces in the forward direction, the rear impact guard 12 might force the barrier 18 from the fully raised position (FIG. 2) to the partially raised position (FIG. 3), where the barrier 18 effectively blocks the rear impact guard 12 from disengagement with the vehicle restraint 10 to restrict or prevent significant movement of the vehicle away from the wall 27.

Figure 4:
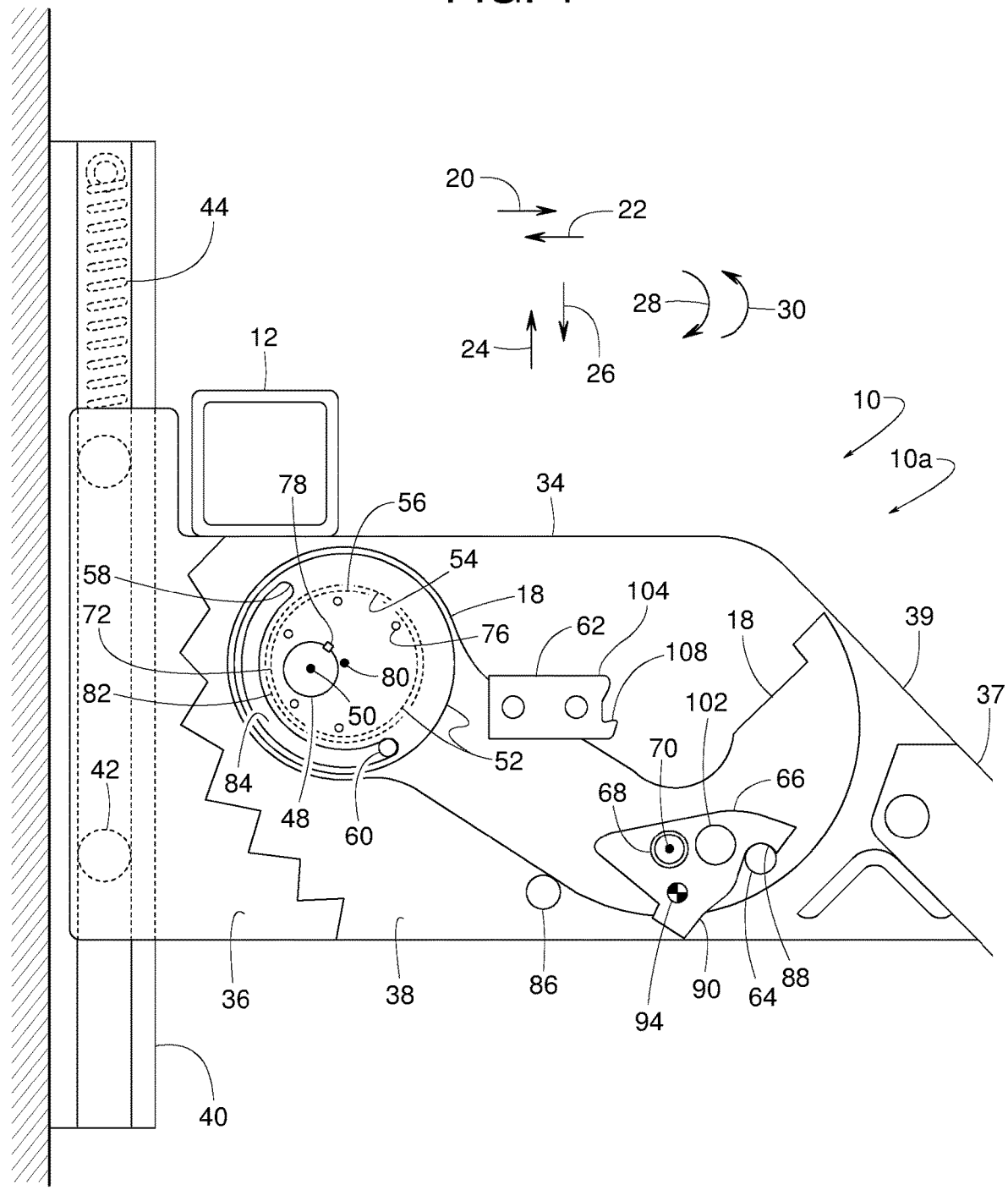
FIG. 4 is a side cutaway view of one example vehicle restraint disclosed herein with an example barrier of the vehicle restraint shown in a first stored position.
Figure 16:
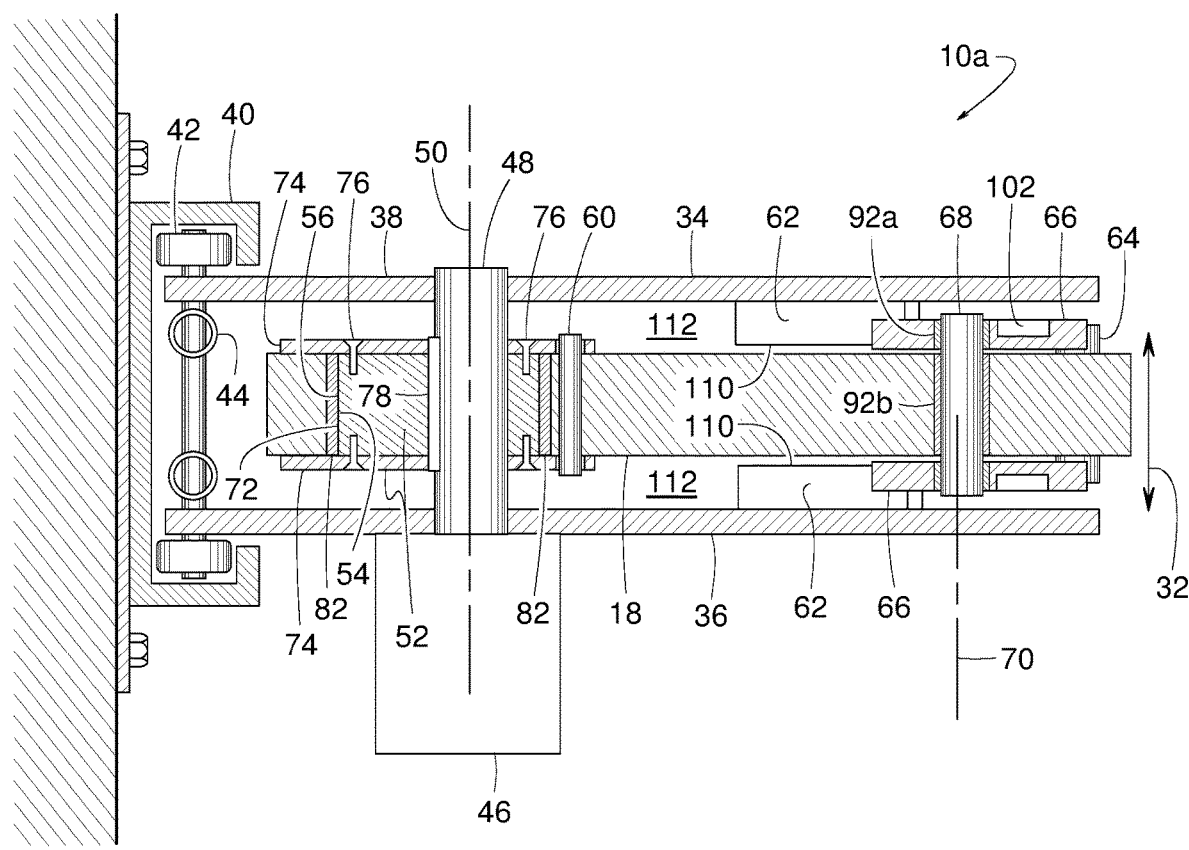
FIG. 16 is a cross-sectional top view of the example barrier taken along line 16-16 of FIG. 10.

FIGS. 4 and 16 show an example construction of an example vehicle restraint 10a. In the illustrated example, the vehicle restraint 10a includes a track 40, a carriage frame 34 (e.g., including a first panel 36 and a second panel 38), a track follower 42 (e.g., rollers, sliding blocks, etc.) to enable the carriage frame 34 to travel along the track 40, at least one bias element 44 (e.g., spring, counterweight, etc.) to urge carriage frame 34 upward. A drive unit 46 (e.g., an electric motor, a hydraulic motor, a pneumatic motor, etc.) supported by the carriage frame 34 includes a drive shaft 48 being driven by the drive unit 46 to rotate in either the counterclockwise direction 30 or clockwise direction 28 about a shaft axis 50. A hub 52 is coupled or affixed to the drive shaft 48. The vehicle restraint 10a also includes a barrier 18 having a bore 54 surrounding or encircling an outer diameter surface 56 of the hub 52A lifting assembly includes an abutment 60 (a pin, a block, a protrusion, etc.) on the barrier 18 and a lifter 58 on the hub 52 (e.g., the lifter 58 being any structure configured to continuously or selectively engage the abutment 60). A stop member 62 is carried or borne by the carriage frame 34. A rocker assembly includes a catch 64 projecting axially from the barrier 18, a rocker member 66 and a pin 68 that couples the rocker member 66 to the barrier 18 such that rocker member 66 can rotate about a rocker axis 70 relative to the barrier 18.

In the illustrated example, the hub 52 is an assembly including an eccentric core 72 positioned between two plates 74. Screws 76 fasten plates 74 to the eccentric core 72. A key 78 prevents relative rotation between the hub 52 and the drive shaft 48 so that both the hub 52 and the drive shaft 48 rotate as a unit or unitary structure about the shaft axis 50.

The hub's central axis 80 and the outer diameter surface 56 are radially off center relative to the shaft axis 50. For example, the shaft axis 50 of the illustrated example is laterally spaced or eccentric relative to the central axis 80 (e.g., the shaft axis 50 is not coaxially aligned relative to the central axis 80). Such offset configuration enables the central axis 80 to rotate and/or laterally shift (e.g., move) relative to the shaft axis 50 when the drive shaft 48 rotates the hub 52. Additionally, the barrier 18 of the illustrated example includes a rotational axis that is coaxially aligned with the central axis 80. As a result, when the hub 52 rotates relative to the barrier 18 about the shaft axis 50, the barrier 18 shifts radially (e.g., horizontally and/or vertically). Such rotational action of the hub 52 moves the barrier 18 in translation between the barrier's retracted position (e.g., FIGS. 5 and 10) and the extended position (e.g., FIGS. 4 and 13). For example, in the extended position shown in FIG. 4, the rotational position of the hub 52 causes the central axis 80 (e.g., and the rotational axis of the barrier 18) to be positioned at a first location such that the shaft axis 50 is positioned between the central axis 80 and the track 44. In other words, due to the eccentric orientation of the central axis 80 relative to the drive axis 50, the central axis 80 shifts relative to the drive axis 50 in the forward direction 20 to cause the barrier 18 to move to the extended position. In the retracted position shown in FIG. 5, the rotational position of the hub 52 (e.g., a 180-degree rotation relative to the position shown in FIG. 4) causes the central axis 80 (e.g., and the rotational axis of the barrier 18) to be positioned at a second location between the shaft axis 50 and the track 44. In other words, due to the eccentric orientation of the central axis 80 relative to the drive axis 50, the central axis 80 shifts relative to the drive axis 50 in the rearward direction 22 to cause the barrier 18 to move to the retracted position. To this end, rotation of the hub 52 along a rotational path in which the abutment 60 travels within a curved slot 84 of the hub 52 (e.g., between a first end of the curved slot 84 and a second end of the curved slot 84) causes the barrier 18 to shift laterally between the retracted position and the extended position. In some examples, a bushing or bearing 82 (e.g., a journal bearing, a rolling element bearing, etc.) is positioned between the hub's outer diameter surface 56 and the barrier's bore 54 to lessen friction and facilitate rotation between the hub 52 and the barrier 18.

To rotate the barrier 18 upward from the lowered, stored position (e.g., FIG. 4) to a raised, deployed position (e.g., FIGS. 6-8), the drive shaft 48 and the hub 52 rotate counterclockwise until the lifter 58 on the hub 52 engages the abutment 60 on the barrier 18. In some examples, the abutment 60 is a pin protruding axially from the barrier 18, and the lifter 58 is provided by a first end of the curved slot 84 formed in the hub 52. When the abutment 60 engages the lifter 58, further rotation of the drive shaft 48 and the hub 52 in the counterclockwise direction 30 causes the barrier 18 to move or lift away from the carriage frame 34 when rotating the barrier 18 in the counterclockwise direction 30. This is explained in greater detail in a later description of an example operating sequence illustrated in FIGS. 4-15.

Figure 9:
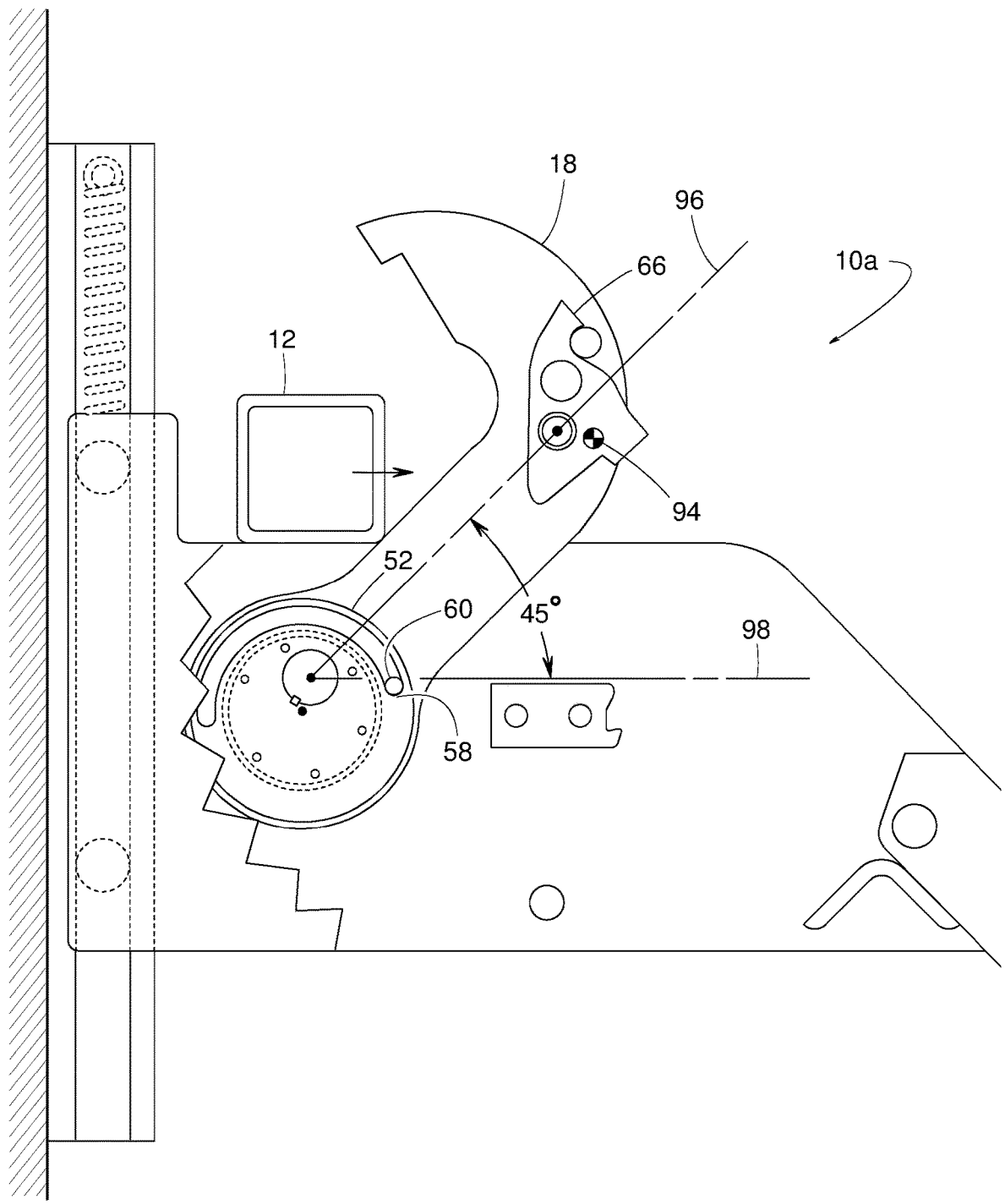
FIG. 9 is a side cutaway view similar to FIG. 4 but showing the example barrier in a sixth deployed position.
Figure 10:
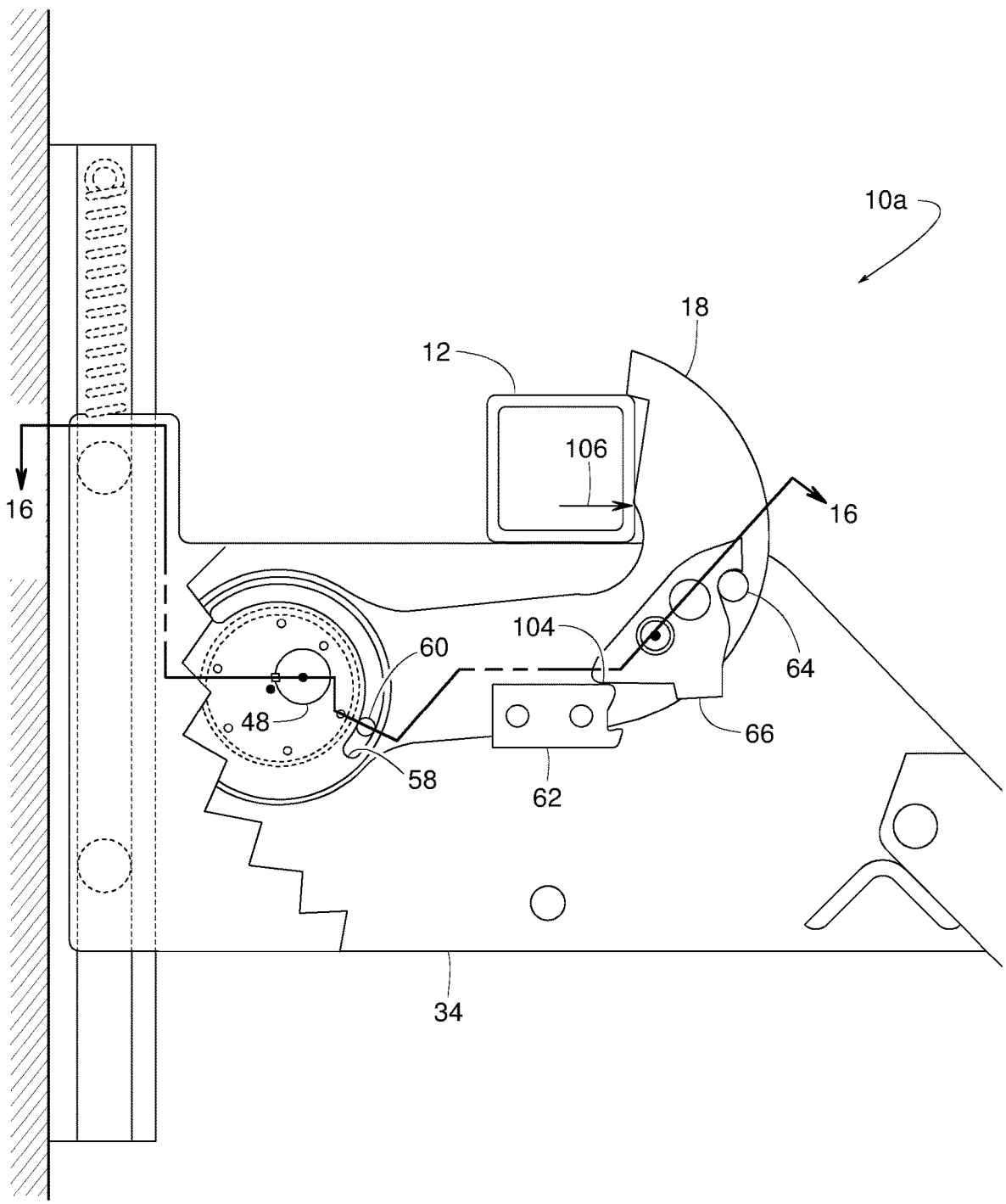
FIG. 10 is a side cutaway view similar to FIG. 4 but showing the example barrier in a seventh deployed position.

In some examples, to help prevent the vehicle's rear impact guard 12 from forcing the barrier 18 in the clockwise direction 28 (e.g., downward) toward the barrier's stored position, the rocker member 66 on the barrier 18 interacts with the stop member 62 on the carriage frame 34, as shown in FIG. 10. In some examples, to enable the barrier 18 to rotate upward past the stop member 62, as shown in FIG. 6, the rocker member 66 pivots about the pin 68 that couples the rocker member 66 to the barrier 18. The catch 64 protruding axially from the barrier 18 limits the rotation of the rocker member 66. This is explained in greater detail in the following description of an example operating sequence, which is illustrated in FIGS. 4-15.

In FIG. 4, the vehicle's rear impact guard 12 is shown (e.g., squarely) on top of the carriage frame 34 of the vehicle restraint 10*a*. The bias element 44 urges the carriage frame 34 upward against the rear impact guard 12. At this position, the barrier 18 is at the stored position resting against a lower pin 86 (e.g., a travel stop) that extends axially between the panels 36 and 38. Although the abutment 60 is positioned in the curved slot 84, the lifter 58 (e.g., the first end of the curved slot 84) of the hub 52 is spaced apart from the abutment 60 on the barrier 18. In the position of FIG. 4, the abutment 60 is in engagement with the second end of the curved slot 84 opposite the lifter 58. Additionally, the barrier 18 is in the extended position, as dictated by the rotational position of the hub 52.

Figure 5:
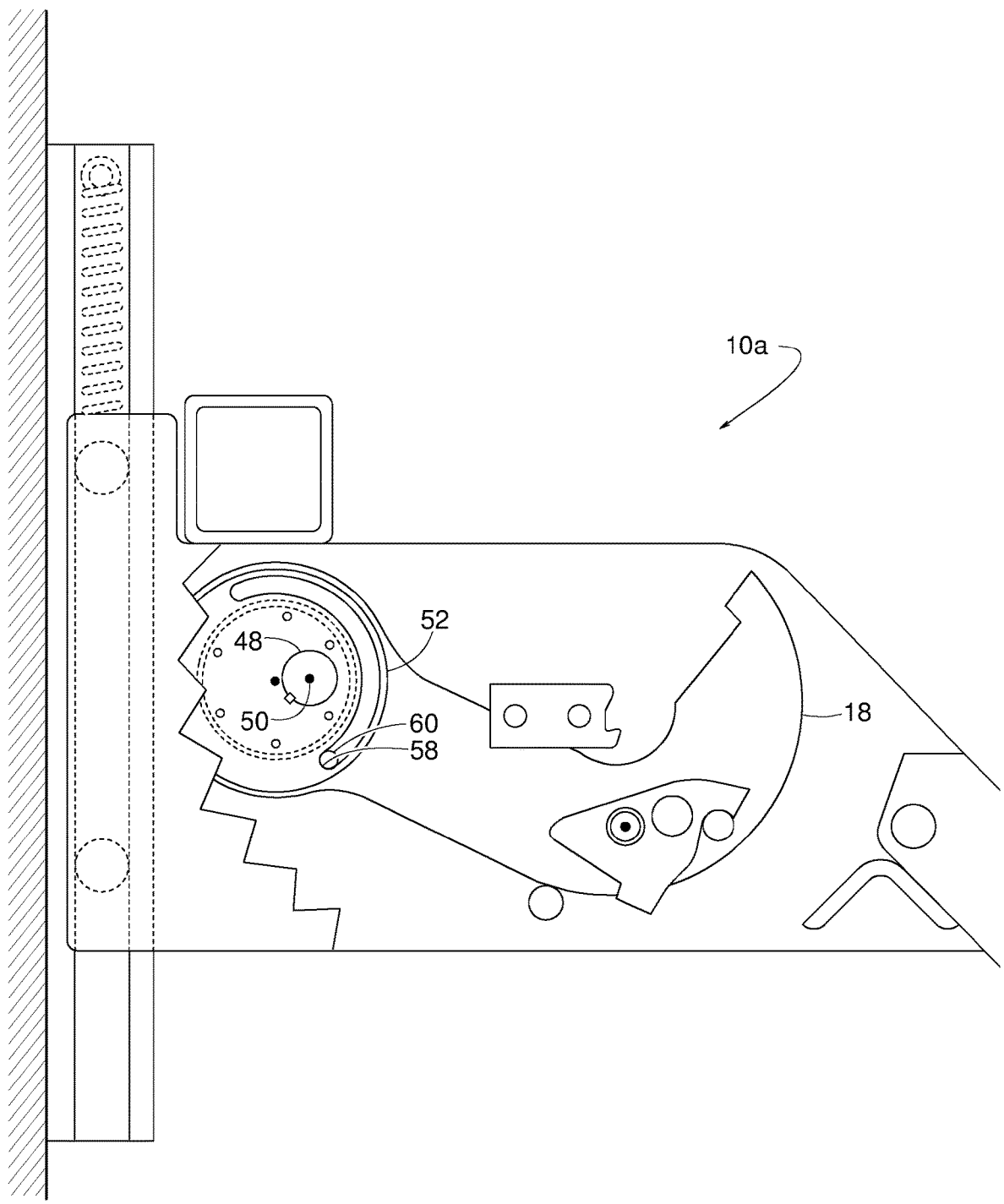
FIG. 5 is a side cutaway view similar to FIG. 4 but showing the example barrier in a second stored position.
Figure 6:
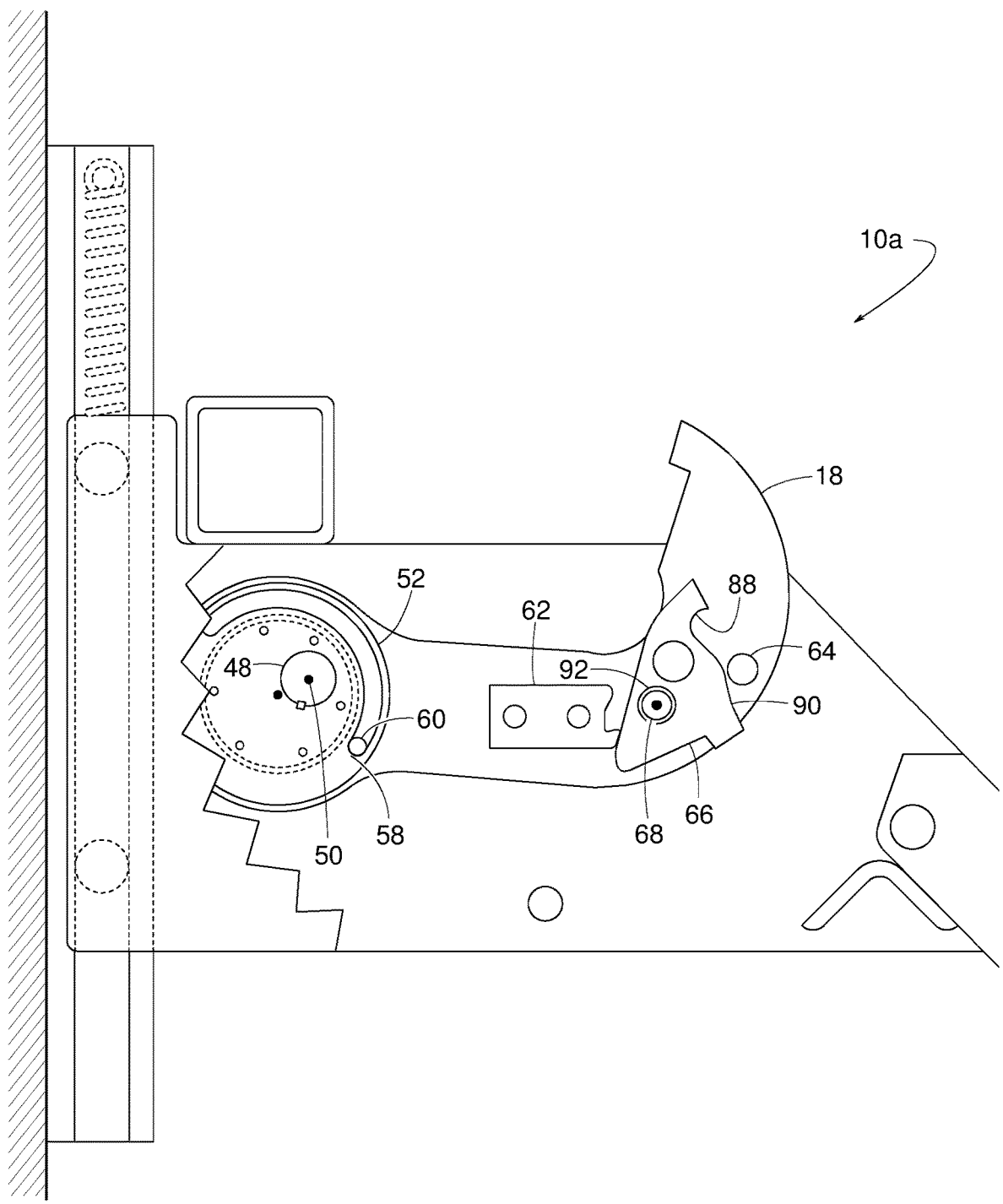
FIG. 6 is a side cutaway view similar to FIG. 4 but showing the example barrier in a first deployed position.

Next, FIG. 5 shows the drive shaft 48 and the hub 52 having rotated about 180 degrees in the counterclockwise direction 30 about the shaft axis 50 while the barrier 18 remains in substantially the same rotational position. For example, the barrier 18 shown in the position of FIG. 5 rests against the lower pin 86. The rotation of the drive shaft 48 and the hub 52 causes the lifter 58 to move along the curved slot 84 and into engagement with the abutment 60, which draws the barrier 18 back to the retracted position.

FIG. 6 shows the drive shaft 48 rotating the hub 52 in the counterclockwise direction about the shaft axis 50. Since the lifter 58 is engaging the abutment 60, the drive shaft 48, the hub 52 and the barrier 18 all rotate together as a unit. For example, the drive shaft 48, the hub 52 and the barrier 18 are operatively coupled in the position shown in FIG. 6 to rotate as a unitary structure when the lifter 58 (e.g., the first end of the curved slot 84) is in engagement with the abutment 60 and the drive shaft 48 rotates in the counterclockwise direction 30. As the barrier 18 rotates in the upward direction and rises above the carriage frame 34, the rocker member 66 engages the stop member 62. The engagement between the rocker member 66 and the stop member 62 when the barrier 18 rotates in the counterclockwise direction 30 causes the rocker member 66 to rotate about the pin 68 in the counterclockwise direction 30 from the forward tilted position (e.g., FIG. 5) toward a rearward tilted position (e.g., FIG. 7). The rocker member 66 being able to pivot allows the barrier 18 and the rocker member 66 to rotate upward past the stop member 62. In the forward tilted position, a first surface 88 of the rocker member 66 engages the catch 64. In the rearward tilted position, a second surface 90 of the rocker member 66 engages the catch 64. In some examples, a bushing or bearing 92 (e.g., bearing 92*a* or 92*b*, as shown in FIG. 16) is positioned between the rocker member 66 and the barrier 18 to reduce friction and facilitate rotation of the rocker member 66.

Figure 7:
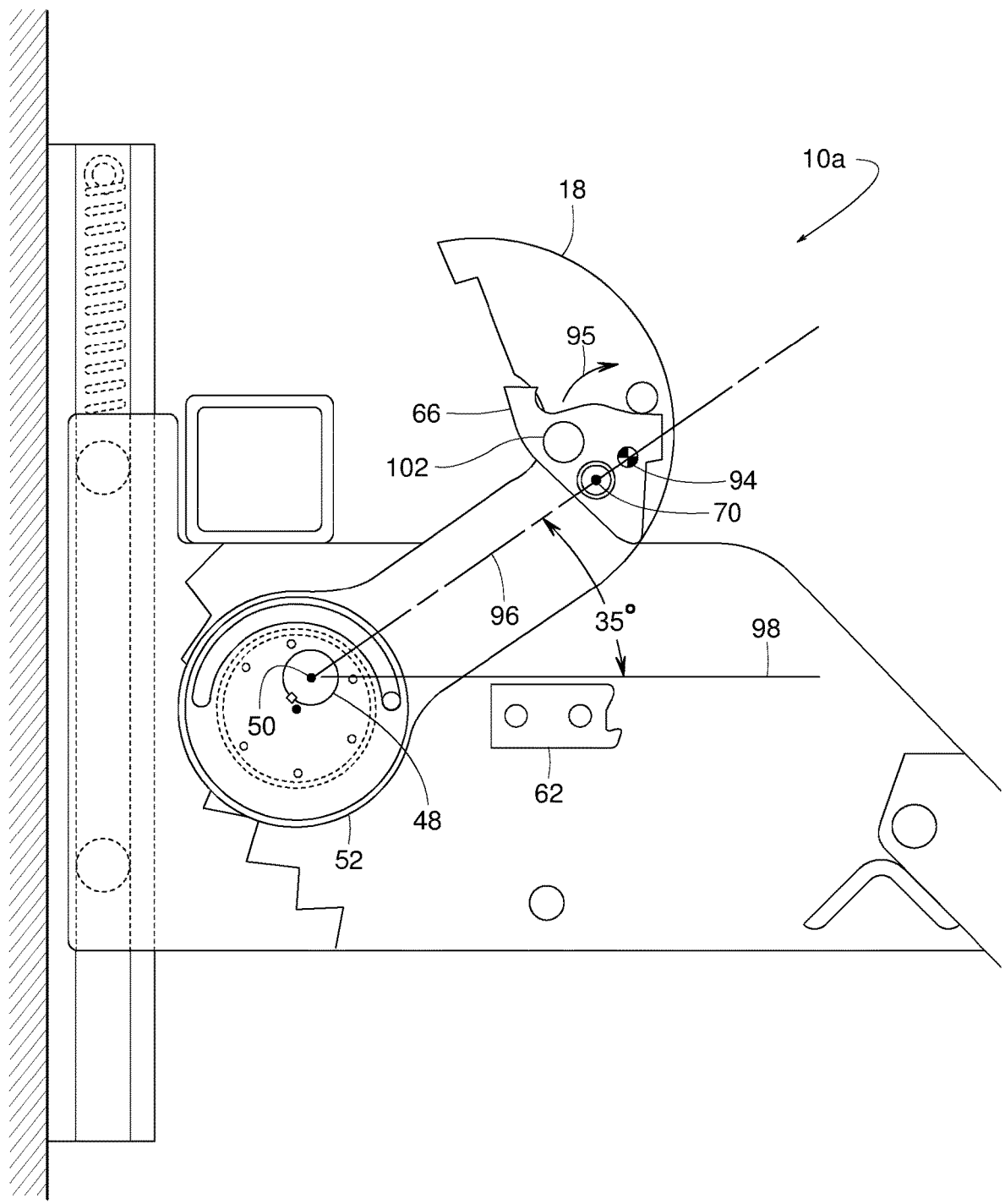
FIG. 7 is a side cutaway view similar to FIG. 4 but showing the example barrier in a second deployed position.
Figure 7A:
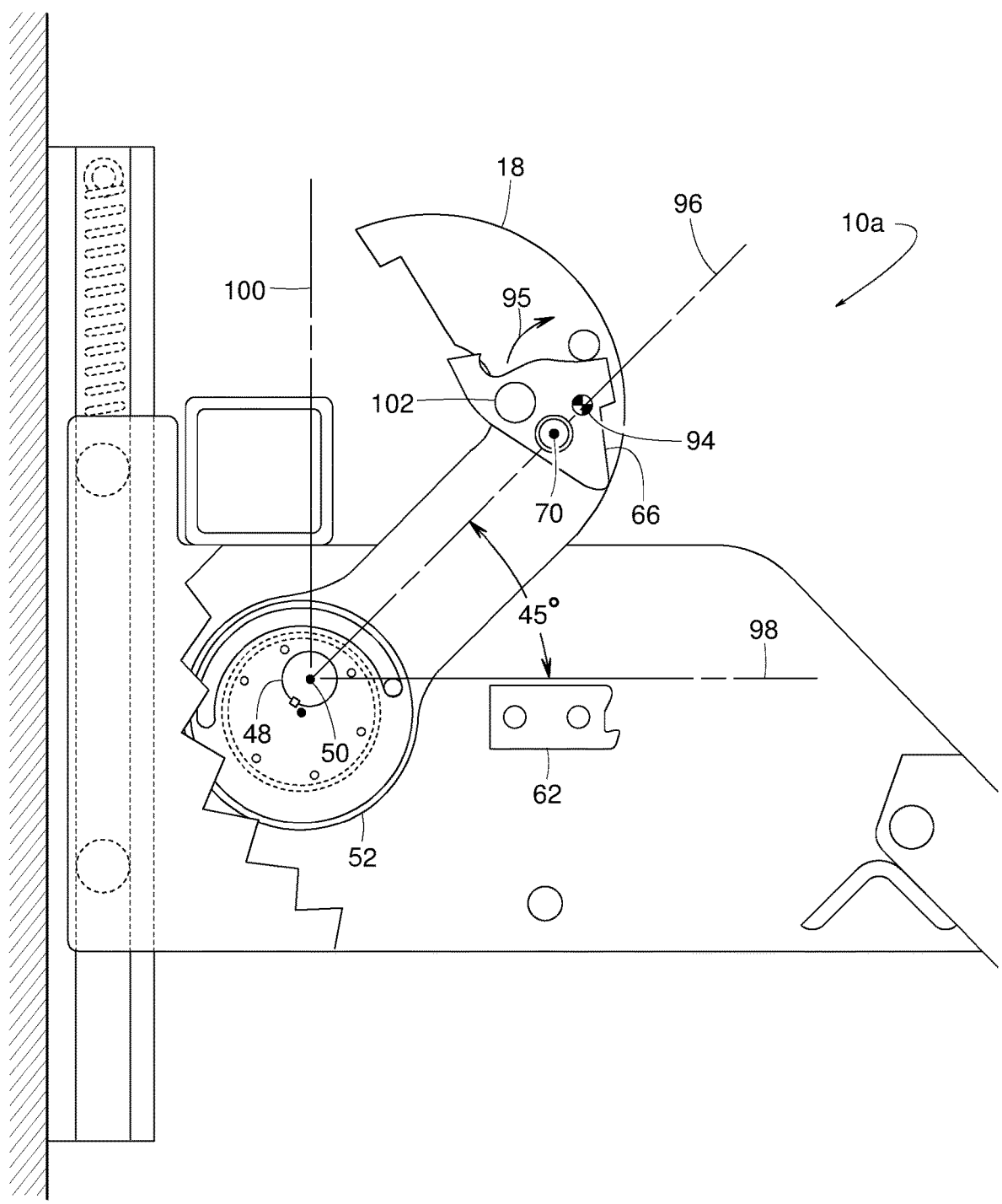
FIG. 7A is a side cutaway view similar to FIG. 4 but showing the example barrier in a third deployed position.
Figure 7B:
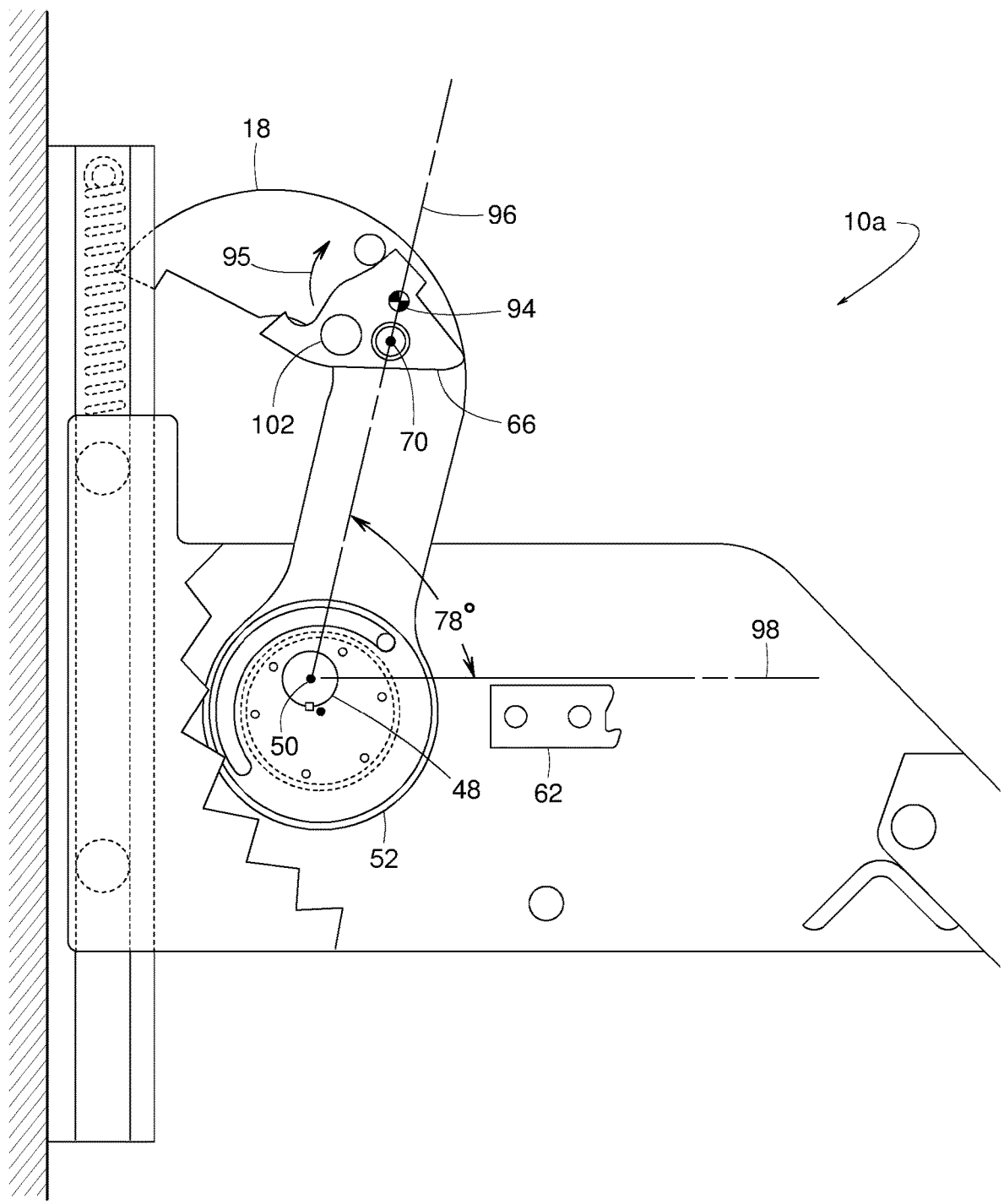
FIG. 7B is a side cutaway view similar to FIG. 4 but showing the example barrier in a fourth deployed position.

FIGS. 7, 7A, and 7B show the drive shaft 48 and the hub 52 having rotated the barrier 18 upward to different incline positions (e.g., a 35-degree incline position, a 45-degree incline position, and a 79-degree incline position, respectively). FIGS. 7, 7A and 7B also illustrate an arrow 95 indicating the tendency and direction of motion that the rocker member 66 may experience as a result of net forces (e.g., gravitational and/or inertial forces imparted to the rocker member 66 during operation). In some examples, to prevent the rocker member 66 from failing to properly engage the stop member 62 when the barrier 18 descends to the position (e.g., a partially inclined position) shown in FIG. 10, the rocker member 66 includes a physical feature or configuration that ensures that the rocker member's center of gravity 94 is situated or located to urge the rocker member 66 toward the forward tilted position when a longitudinal axis 96 of the barrier 18 is at an angular position (e.g., an angle) relative to horizontal of, for example, approximately 35 degrees (e.g., plus or minus 1-degree) while the barrier 18 is deployed. The longitudinal axis 96 is defined as a line perpendicular to and intersecting the shaft axis 50 and the rocker axis 70. In some examples, the rocker member 66 is configured such that the center of gravity 94 is positioned to urge the rocker member 66 toward the forward tilted position when the longitudinal axis 96 of the barrier 18 is at an angular position (e.g., an angle) relative to horizontal of, for example, approximately 78 degrees (e.g., plus or minus 1-degree) while the barrier 18 is deployed. In some examples, the rocker member 66 is configured such that the center of gravity 94 is positioned to urge the rocker member 66 toward the forward tilted position when the longitudinal axis 96 of the deployed barrier 18 is at any angular position (e.g., an angle) relative to horizontal greater than approximately 35 degrees and less than approximately 78 degrees (e.g., while the barrier 18 is deployed). For example, the rocker member 66 may be configured such that the center of gravity 94 is positioned to urge the rocker member 66 toward the forward tilted position when the longitudinal axis 96 of the deployed barrier 18 is at any angular position (e.g., an angle) relative to horizontal between, for example, approximately 35 degrees and 78 degrees (e.g., while the barrier 18 is deployed). Examples of physical features that advantageously position the rocker member's center of gravity 94 include one or more of a cavity 102, a weight added to the rocker member 66, or providing rocker member 66 with an outer periphery of a certain shape. The aforementioned features can be implemented individually or in various combinations.

Figure 8:
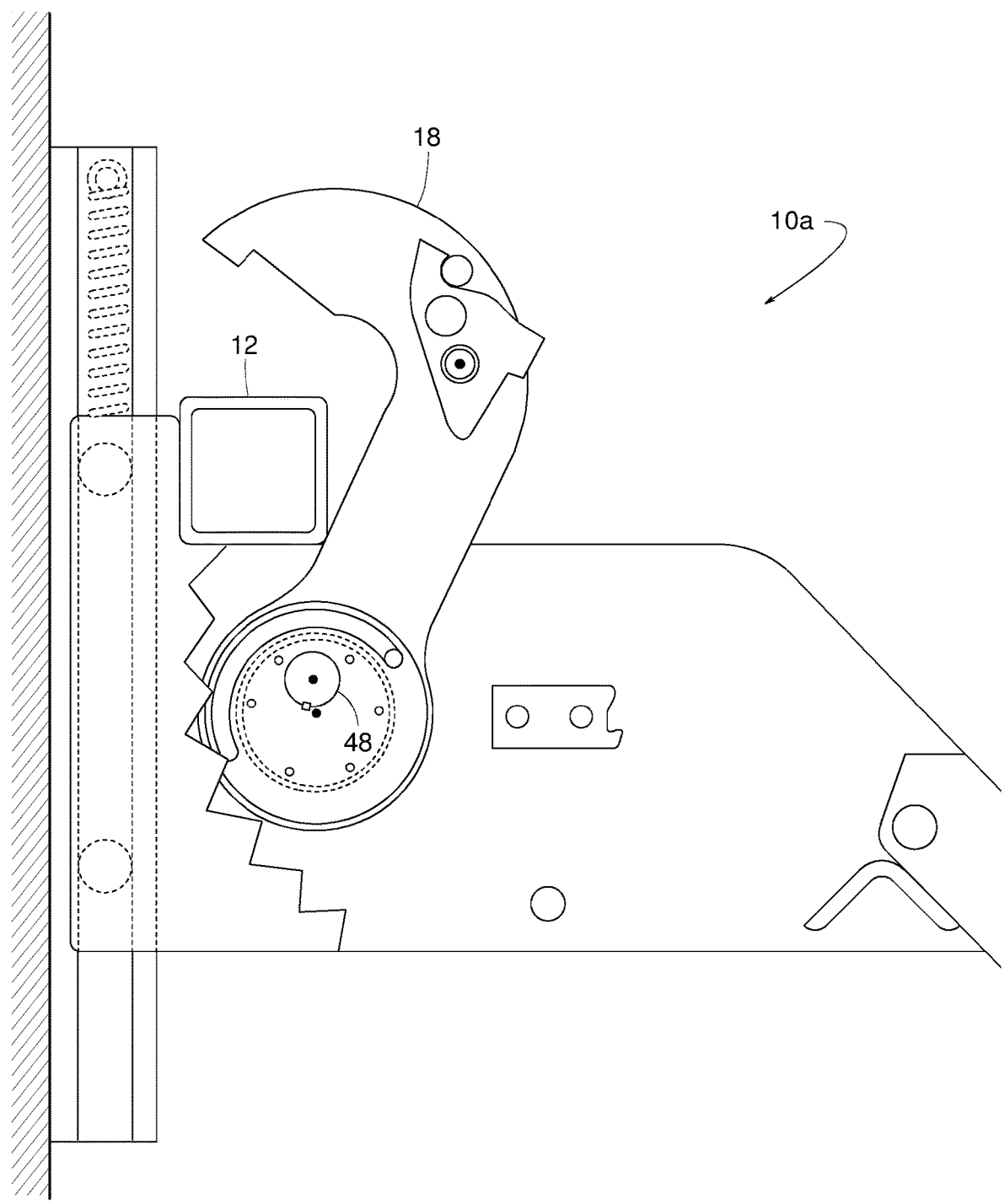
FIG. 8 is a side cutaway view similar to FIG. 4 but showing the example barrier in a fifth deployed position.

FIG. 8 shows the drive shaft 48 having rotated the barrier 18 up to the fully raised, deployed position. In this example position, the barrier 18 is shown in engagement with (e.g., up against) the vehicle's rear impact guard 12.

FIG. 9 shows the vehicle's rear impact guard 12 pushing the barrier 18 with a force in the forward direction causing the barrier to rotate downward from approximately a 78-degree angle to a 45-degree angle relative to horizontal. Since the lifter 58 is engaging the abutment 60, the forward movement of the rear impact guard 12 causes the hub 52 to rotate in a clockwise direction 28. FIG. 9 also shows the rocker member's center of gravity 94 having tilted the rocker member 66 forward to the forward tipped position.

FIG. 10 shows the barrier 18 at a partially raised, deployed position but still sufficiently elevated above the carriage frame 34 to block forward movement of the rear impact guard 12. In this position, the rocker member 66 is in the forward tilted position to engage the catch 64 and an upper ledge 104 of the stop member 62. If the rear impact guard 12 exerts a forward force 106 against the barrier 18, the rocker member 66 engagement with the stop member's upper ledge 104 prevents the barrier 18 from descending in reaction to the forward force 106 even if the drive shaft 48 begins to rotate the lifter 58 in the clockwise direction 28 away from the barrier's abutment 60, as shown in FIG. 10.

Figure 11:
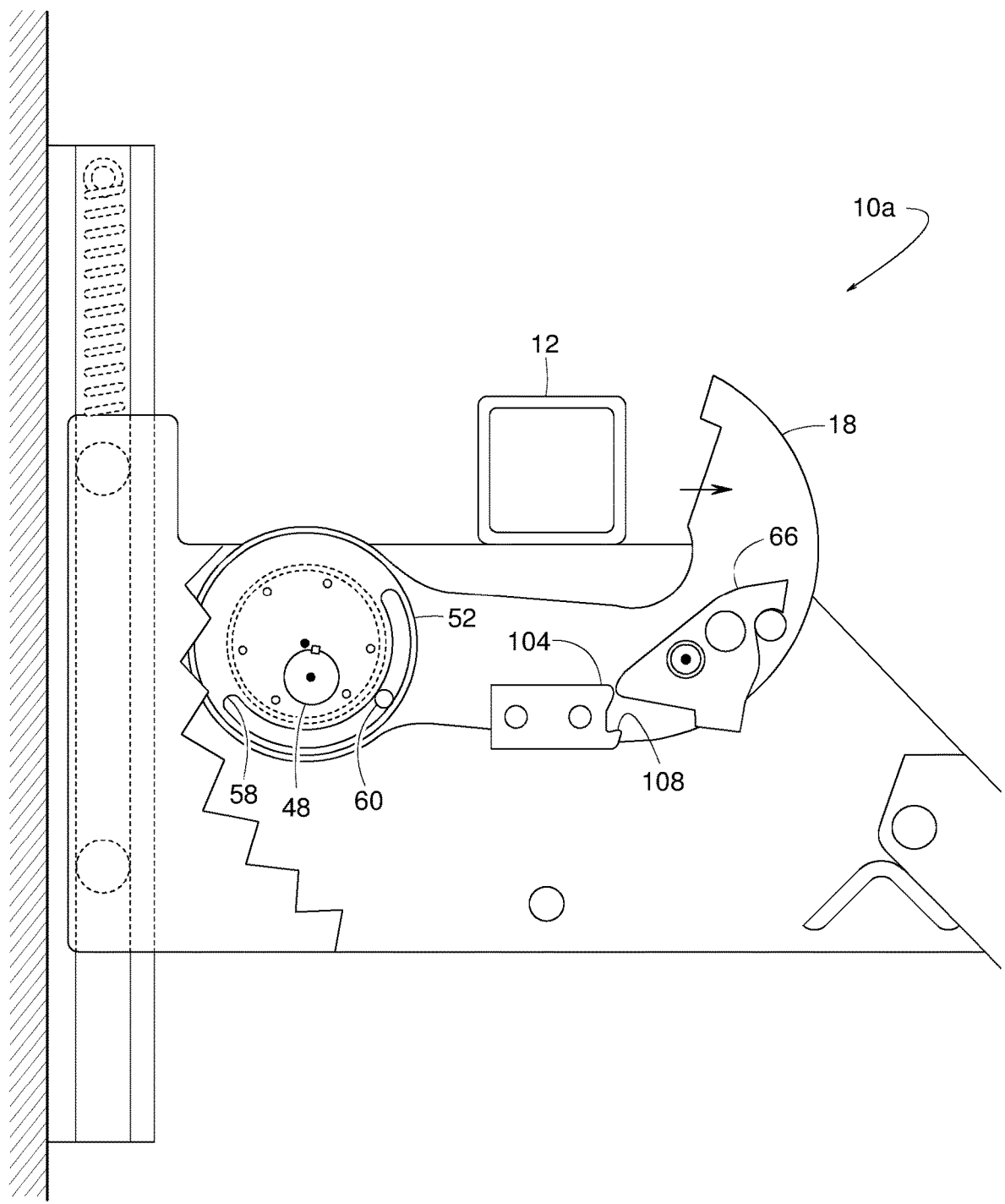
FIG. 11 is a side cutaway view similar to FIG. 4 but showing the example barrier in an eighth deployed position.

FIG. 11 shows the vehicle restraint 10a releasing the vehicle 14. To release the rear impact guard 12, the drive shaft 48 rotates the hub 52 in the clockwise direction 28. As a result, the hub's lifter 58 travels within the curved slot 84 and moves farther away from the barrier's abutment 60. As noted above, such rotation of the hub 52 causes the barrier 18 to move laterally forward away from the rear impact guard 12. As the barrier 18 moves laterally forward, the rocker member 66 moves laterally forward until the rocker member 66 slides off the stop member's upper ledge 104, as shown in FIG. 11. The barrier 18 then rotates or lowers (e.g., drops) by gravity until the rocker member 66 engages the lower ledge 108 of the stop member 62, as shown in FIG. 12.

Figure 12:
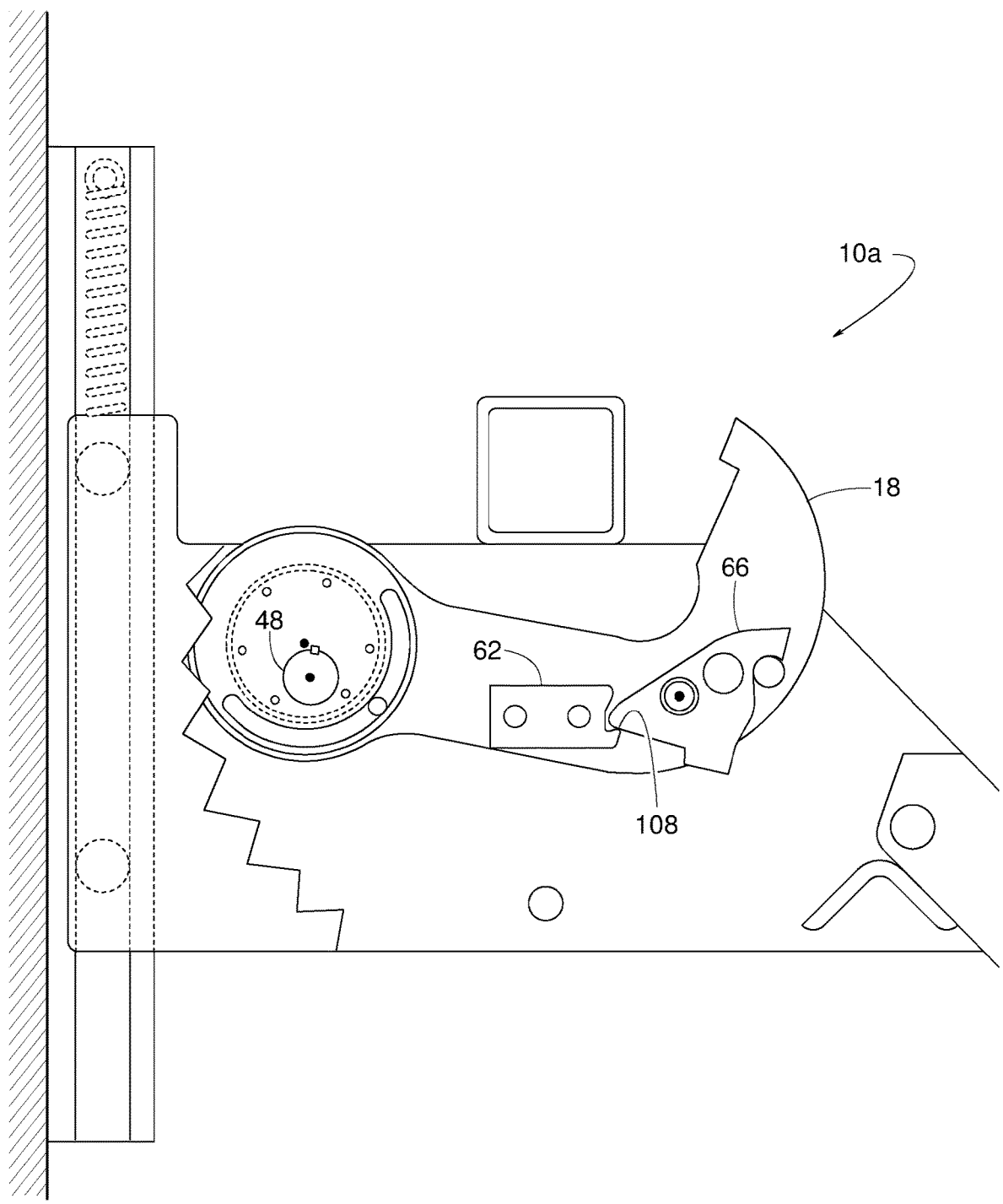
FIG. 12 is a side cutaway view similar to FIG. 4 but showing the example barrier in a ninth deployed position.

FIG. 12 shows the rocker member 66 resting on top of the stop member's lower ledge 108 to support the weight of the barrier 18. The drive shaft 48 continues rotating or turning in the clockwise direction 28 to shift the barrier 18 forward toward the extended position. As the barrier 18 moves forward toward the extended position, the rocker member 66 disengages from (e.g., falls off) the edge of the stop member's lower ledge 108, as shown in FIG. 13.

Figure 13:
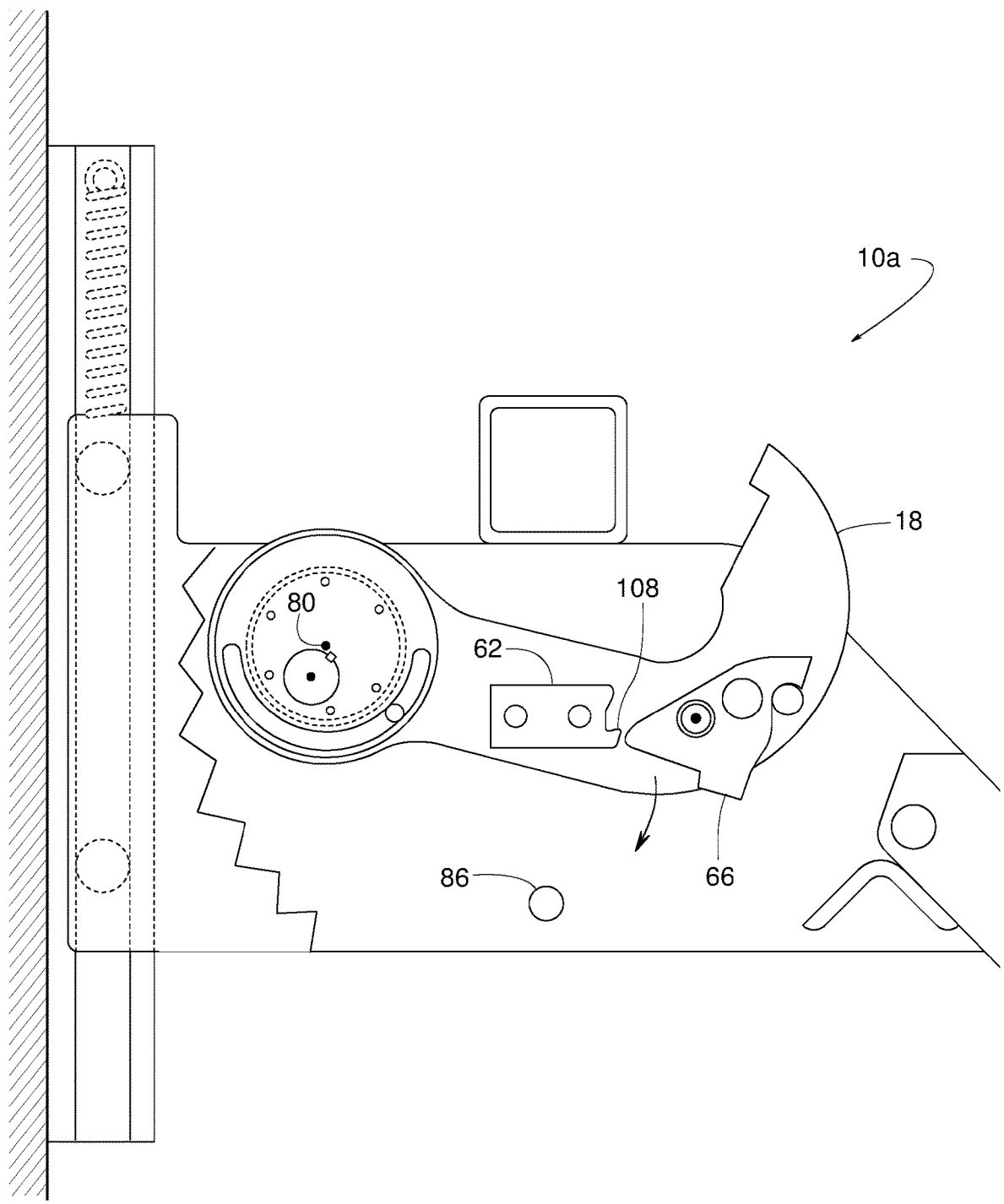
FIG. 13 is a side cutaway view similar to FIG. 4 but showing the example barrier in a tenth deployed position.

FIG. 13 shows the barrier 18 free to rotate downward by gravity. The barrier 18 rotates about the hub's central axis 80 and engages (e.g., comes to rest upon) the lower pin 86, as shown in FIG. 14.

Figure 14:
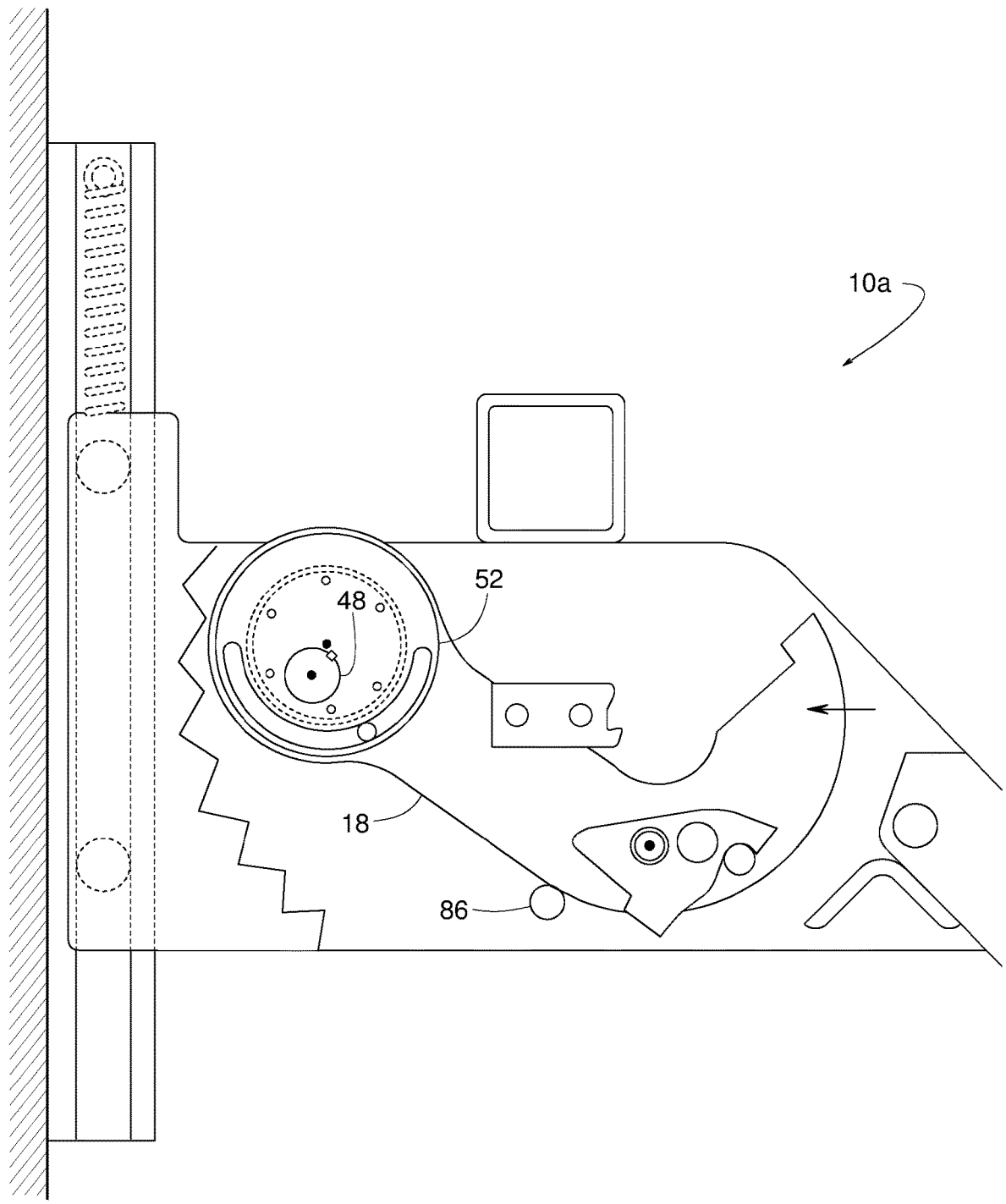
FIG. 14 is a side cutaway view similar to FIG. 4 but showing the example barrier in a third stored position.

FIG. 14 shows that while the barrier 18 is resting upon the lower pin 86, the drive shaft 48 continues rotating or turning the hub 52 in the clockwise direction 28 to shift the barrier 18 forward toward the extended position.

Figure 15:
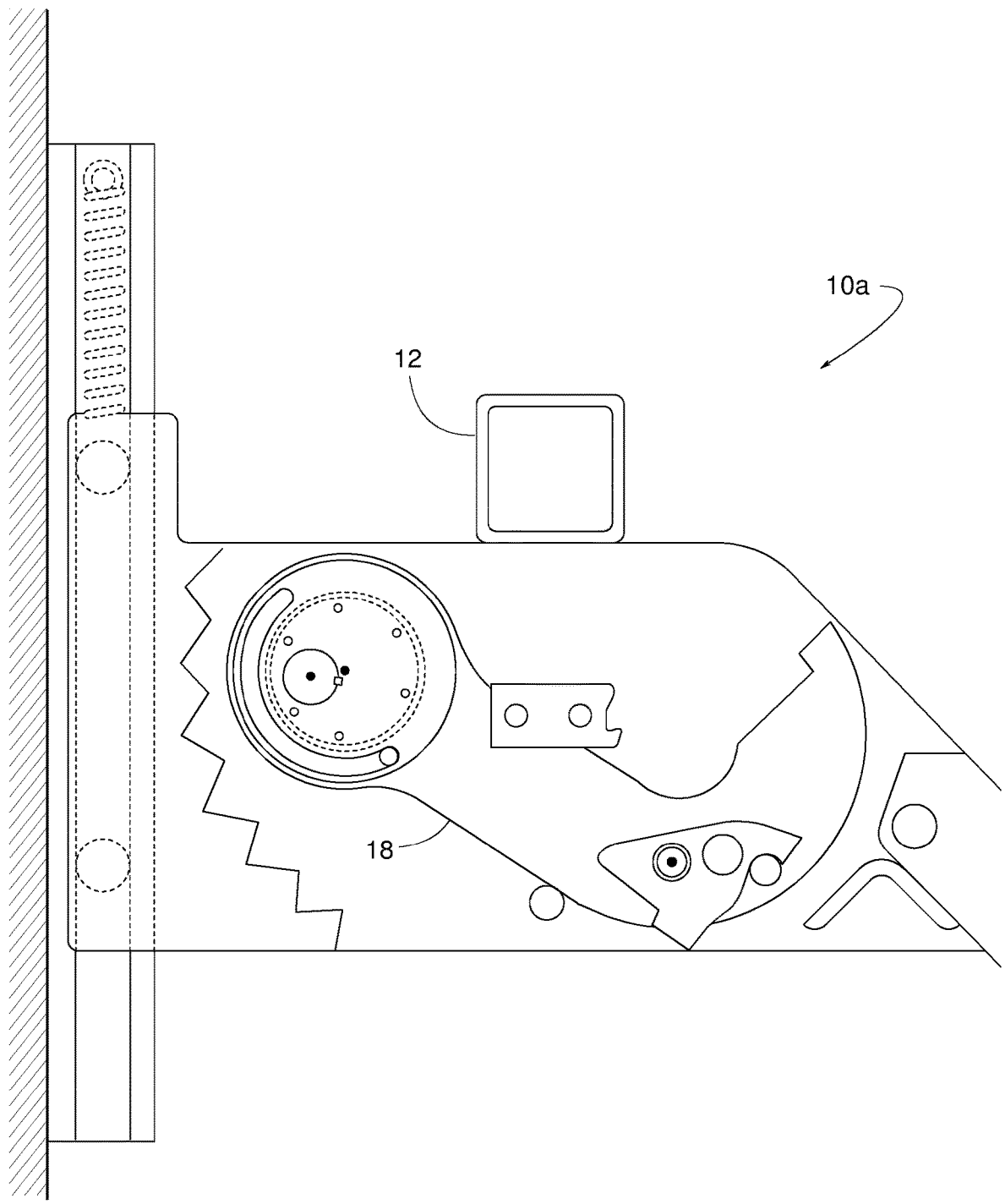
FIG. 15 is a side cutaway view similar to FIG. 4 but showing the example barrier in a fourth stored position.

FIG. 15 shows the barrier 18 rotated down into the rotationally stored position and shifted forward to the extended position. The vehicle 14 is free to enter or leave vehicle restraint 10a.

Figure 17:
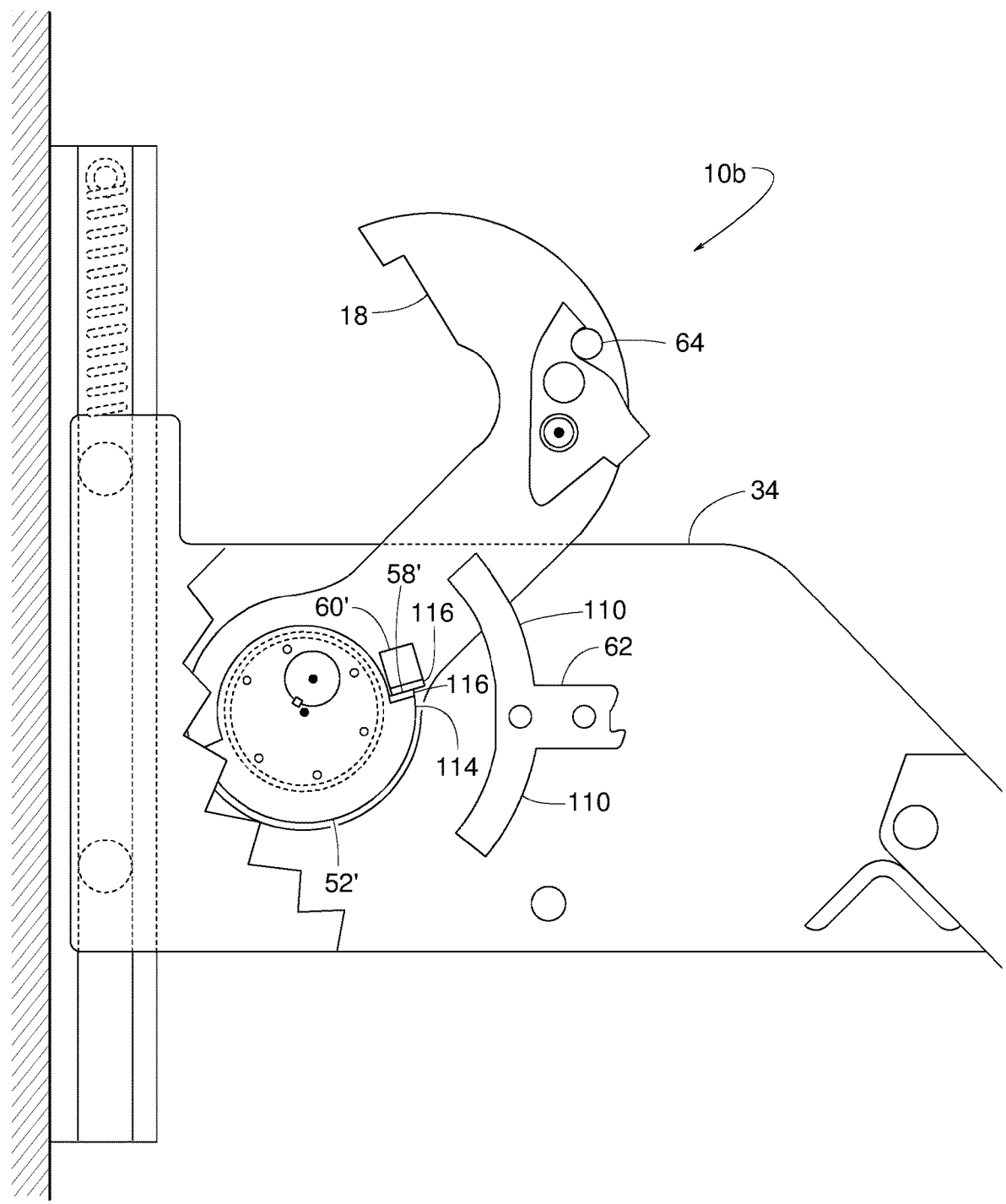
FIG. 17 is a side cutaway view of another example vehicle restraint disclosed herein.
Figure 18:
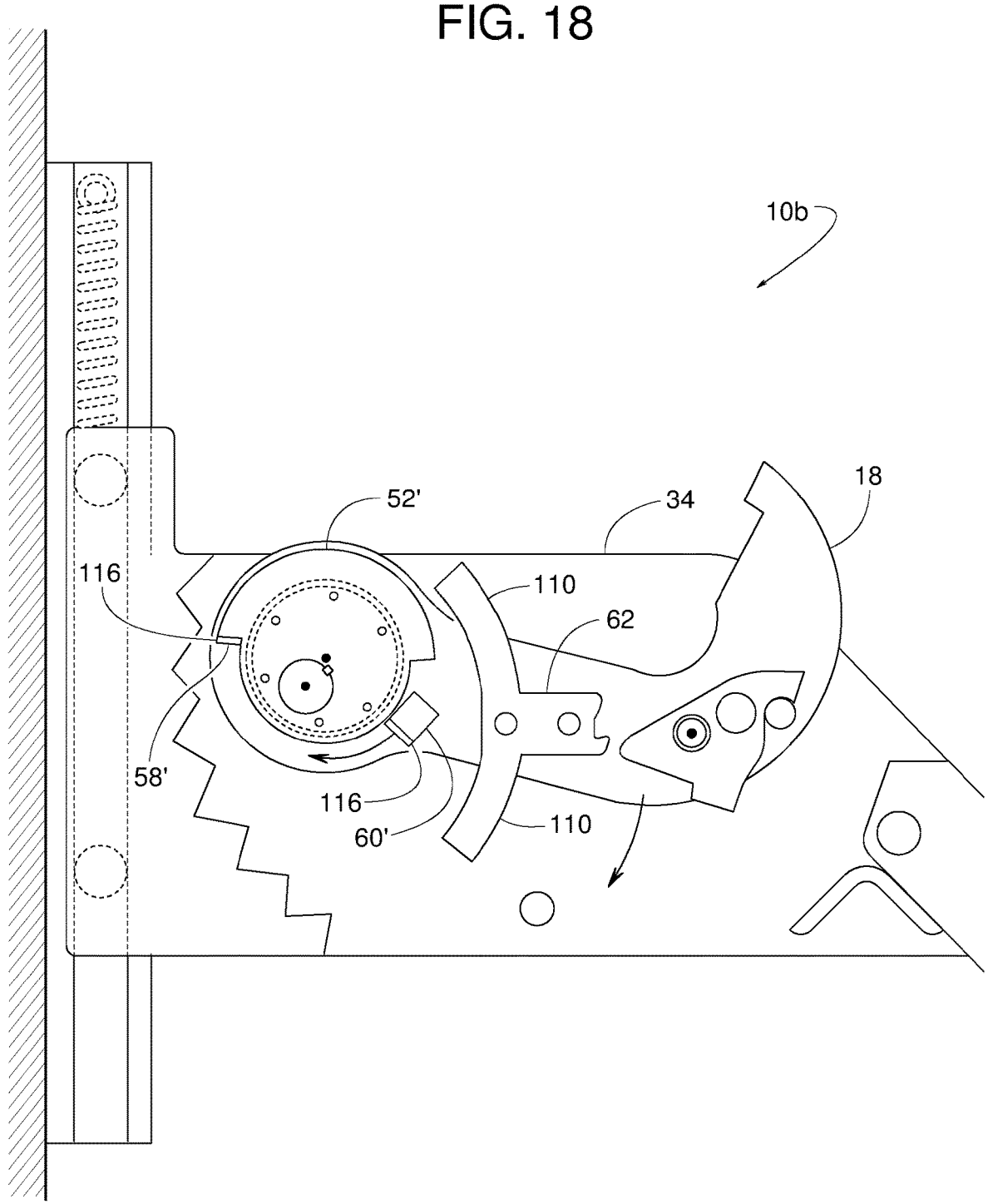
FIG. 18 is a side cutaway view similar to FIG. 17 but showing an example barrier of the example vehicle restraint of FIG. 17 in another position.

FIG. 16 is a top, cross-sectional view of the vehicle restraint 10a taken along line 16-16 of FIG. 10. FIG. 16 shows that in some examples vehicle restraint 10a includes a standoff 110 attached to each of the first panel 36 and the second panel 38. The panels 36 and 38 are axially spaced apart from each other to define a gap or space 112 between them. Each standoff 110 protrudes axially into the space 112 and toward the barrier 18. The standoffs 110 inhibit the barrier 18 and the rocker member 66 from moving in axial direction 32 against either panel 36 or 38. In some examples, the standoffs 110 extend substantially along the rotational range of the barrier 18 (FIGS. 17-18). In the illustrated examples, the standoff 110 is an integral part of the stop member 62. In some examples, the standoff 110 is a separate part not attached to the stop member 62.

FIGS. 17 and 18 illustrate another vehicle restraint 10b having a hub 52' that includes a lifting assembly with an abutment 60' (e.g., a sturdier abutment 60' than the abutment 60 of FIGS. 4-16), and a lifter 58' (e.g., a wider lifter 58' than the lifter 58 of FIGS. 4-16). FIG. 17 corresponds to FIG. 9, and FIG. 18 corresponds to FIG. 13. In this example, the curved slot 84 is eliminated, and the abutment 60' is in the form of a block extending axially from the barrier 18. Eliminating the curved slot 84 permits the use of a much larger abutment (e.g., than the abutment 60 of FIGS. 4-16). In some examples, the abutment 60' extends radially substantially as far as an outermost perimeter 114 of the hub 52'. Alternatively, the abutment 60' extends radially at least as far as an outermost perimeter 114 of the hub 52'. In some examples, the lifter 58' and/or the abutment 60' includes a shock absorber 116 that is more resilient than the base material supporting the shock absorber 116. The shock absorber 116 is schematically illustrated to represent various example shock absorbers including a polyurethane pad, a pad of another polymeric material, a spring, a belleville washer, a stack of belleville washers, etc., and/or any combination thereof.

Figure 19:
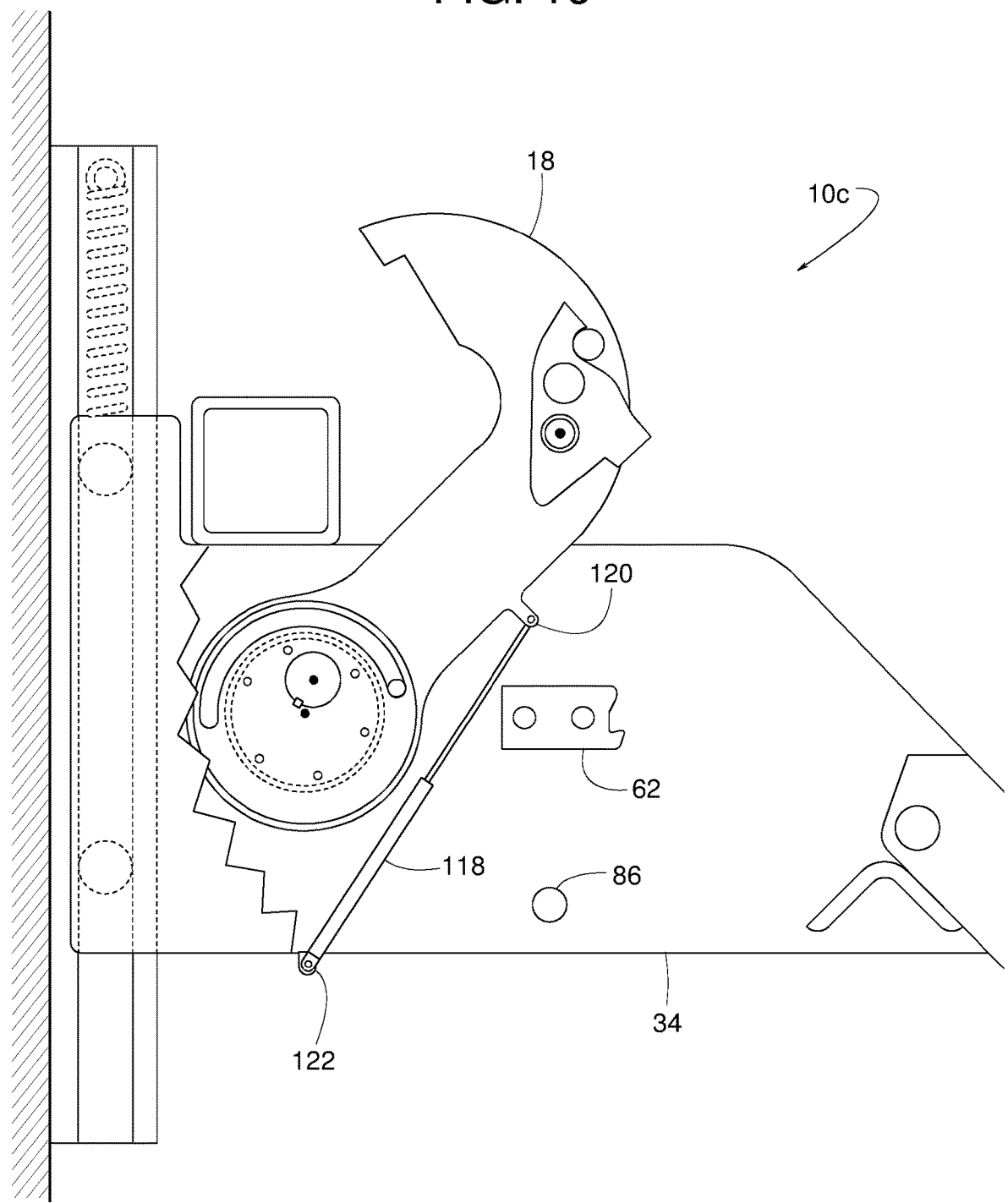
FIG. 19 is a side cutaway view of another example vehicle restraint disclosed herein.

In addition or alternatively, example vehicle restraint 10*c* of FIG. 19 includes a gas spring 118 that slows the gravitational descent of the barrier 18. In the illustrated example, the gas spring 118 has one end 120 coupled to the barrier 18 and an opposite end 122 coupled to the carriage frame 34. Slowing the barrier's descent reduces (e.g., minimizes) various impact forces on the stop member 62 and the lower pin 86.

Figure 20:
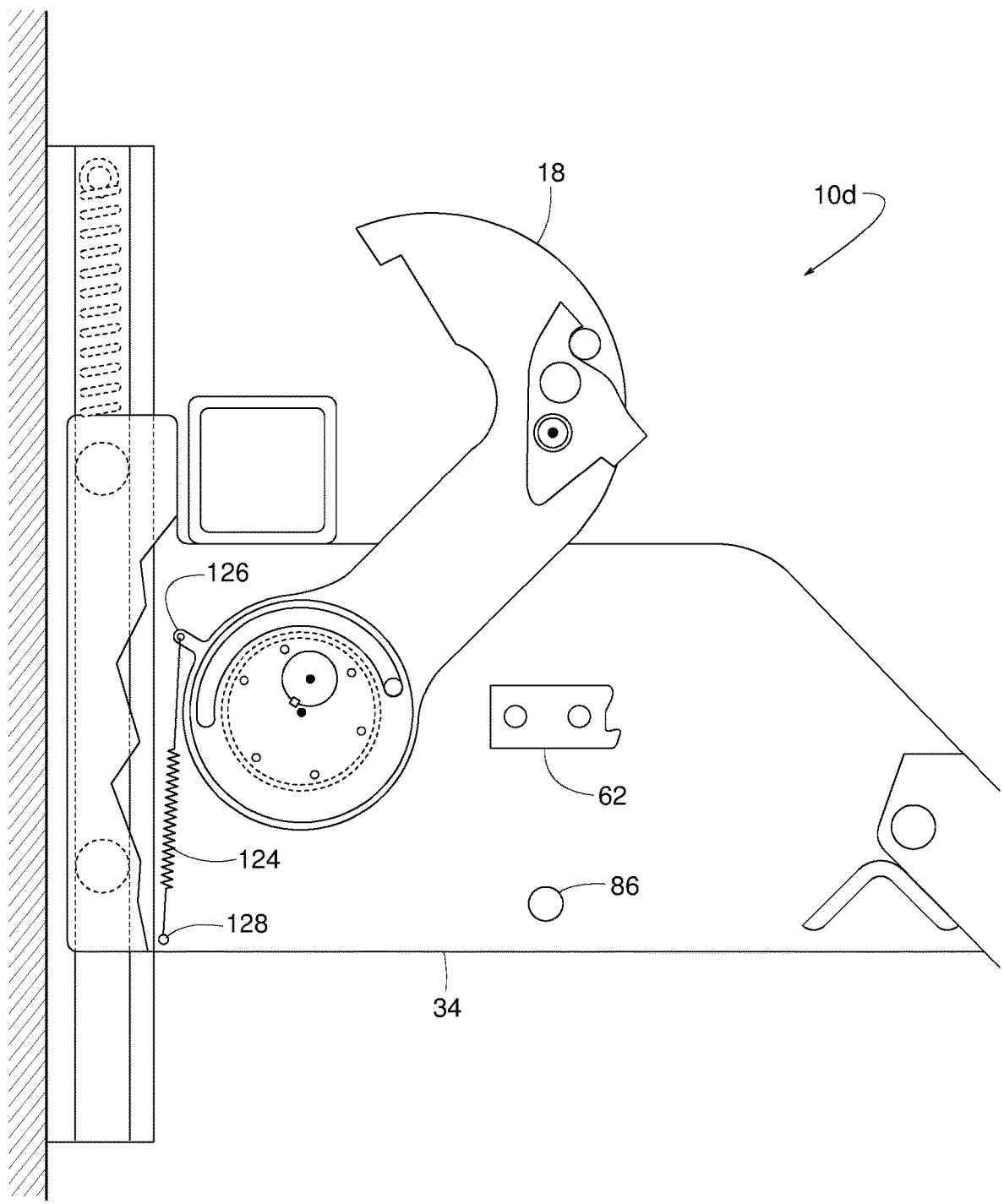
FIG. 20 is a side cutaway view of another example vehicle restraint disclosed herein.

In addition or alternatively, example vehicle restraint 10*d* of FIG. 20 includes an extension spring 124 that slows the gravitational descent of the barrier 18. In the illustrated example, the extension spring 124 has one end 126 coupled to the barrier 18 and an opposite end 128 coupled to the carriage frame 34.

Figure 21:
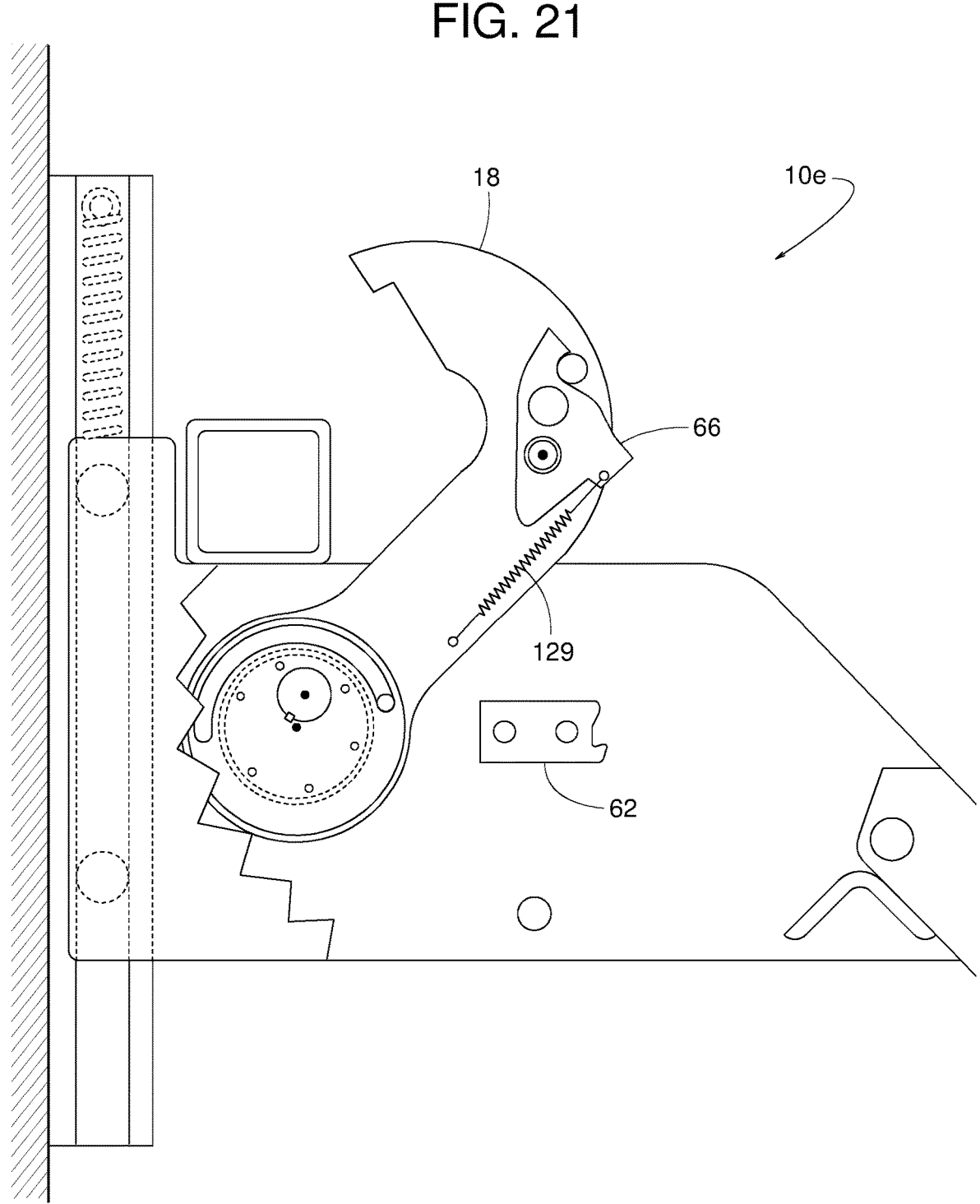
FIG. 21 is a side cutaway view of another example vehicle restraint disclosed herein.

In addition or alternatively, example vehicle restraint 10*e* of FIG. 21 includes a biasing element 129 (e.g., extension spring, torsion spring, compression spring, counter weight mechanism etc.) for urging the rocker member 66 towards the forward tipped position. The biasing element 129 provides a greater tipping force than gravity alone. Thus, in some examples, the biasing element 129 can reduce the importance of strategically positioning the rocker member's center of gravity and ensures the rocker member 66 will connect with the stop member 62 when the barrier 18 is rotated clockwise.

Example vehicle restraint 10*f* of FIGS. 22-25 includes a stop member 130 projecting axially from the barrier 18. The vehicle restraint 10*f* also includes an example rocker assembly with a rocker member 132, a pin 134 pivotally connecting the rocker member 132 to second panel 38 of carriage frame 34, and a catch 136 projecting axially from second panel 38. The catch 136 prevents the rocker member 132 from pivoting too far in either direction.

Example vehicle restraint 10*g*, shown in FIGS. 26-29 is very similar to vehicle restraint 10*f*. Instead of the catch 136, however, the rocker assembly of the vehicle restraint 10*g* has a first pin 138 protruding axially from a rocker member 140, and a second pin 142, which pivotally couples the rocker member 140 to second panel 38. The first pin 138 travels along a curved slot 144 in the panel 38 and limits the pivotal motion of the rocker member 140. A catch 149 is defined by the lower most portion of the curved slot 144.

Example vehicle restraint 10*h*, shown in FIGS. 30-33 is similar to vehicle restraint 10*g*. However, instead of the rocker member 140 tipping forward and downward by gravity alone, the rocker member 146 is urged toward the forward tipped position by a biasing element 148 and stopped by the catch 149. In the illustrated example, the biasing element 148 is an extension spring, but in other examples, the biasing element 148 could be a torsion spring, a compression spring, a counter weight mechanism, etc.

Figure 22:
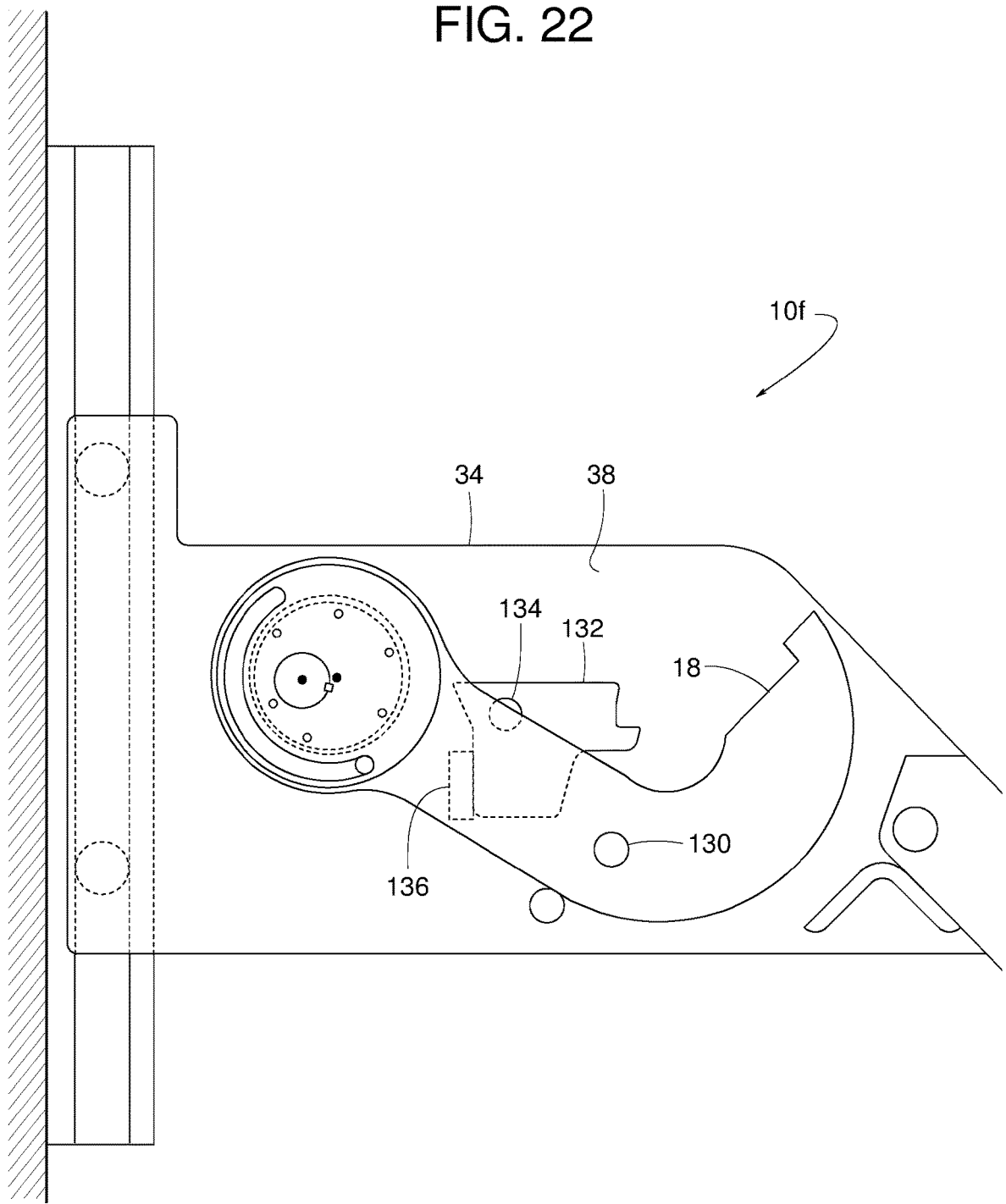
FIG. 22 is a side view of another example vehicle restraint disclosed herein with an example barrier of the vehicle restraint shown in an example first stored position, where a carriage panel is omitted to more clearly show other parts of the vehicle restraint.
Figure 23:
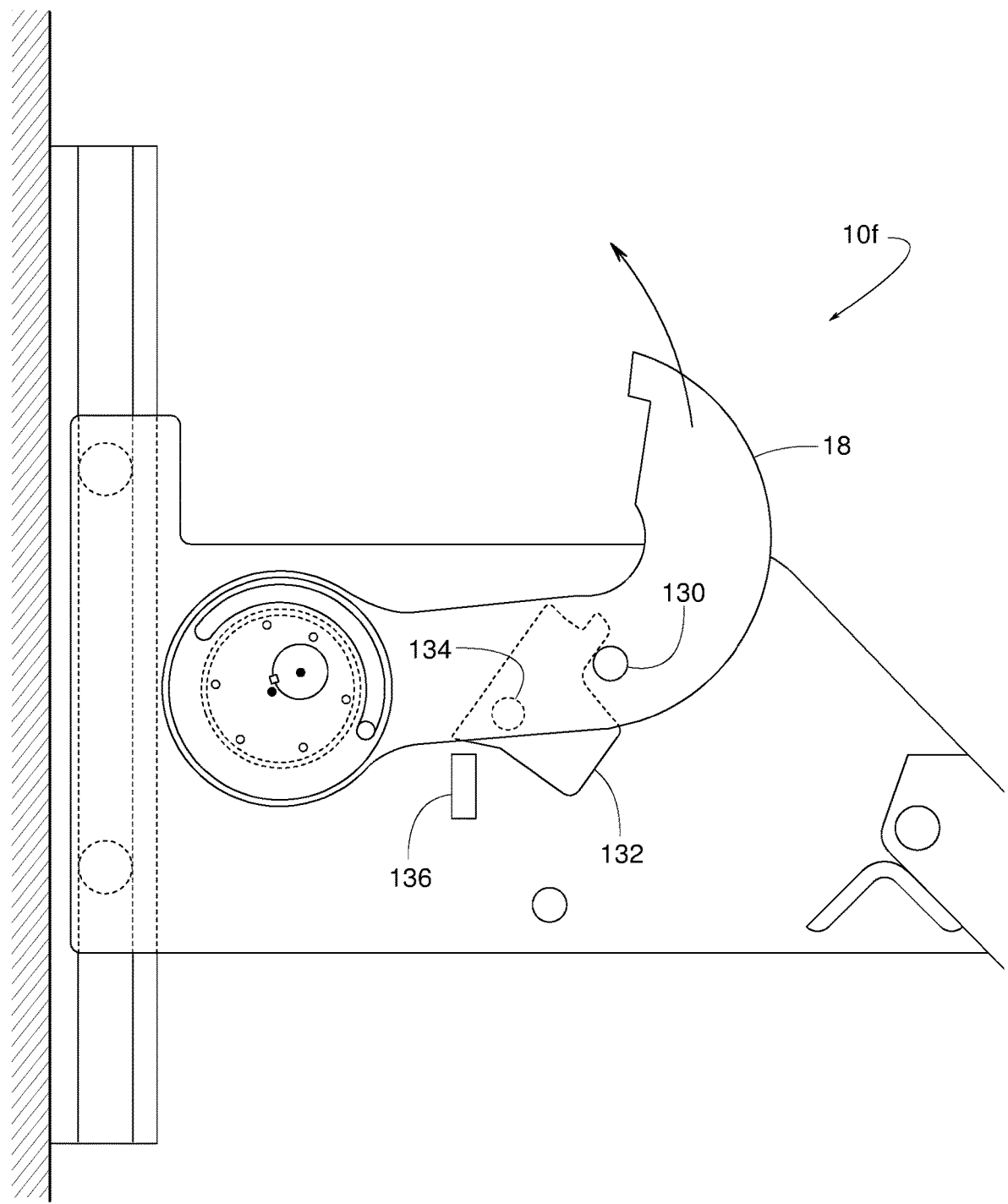
FIG. 23 is a side view similar to FIG. 22 but showing the example barrier in a first deployed position.
Figure 24:
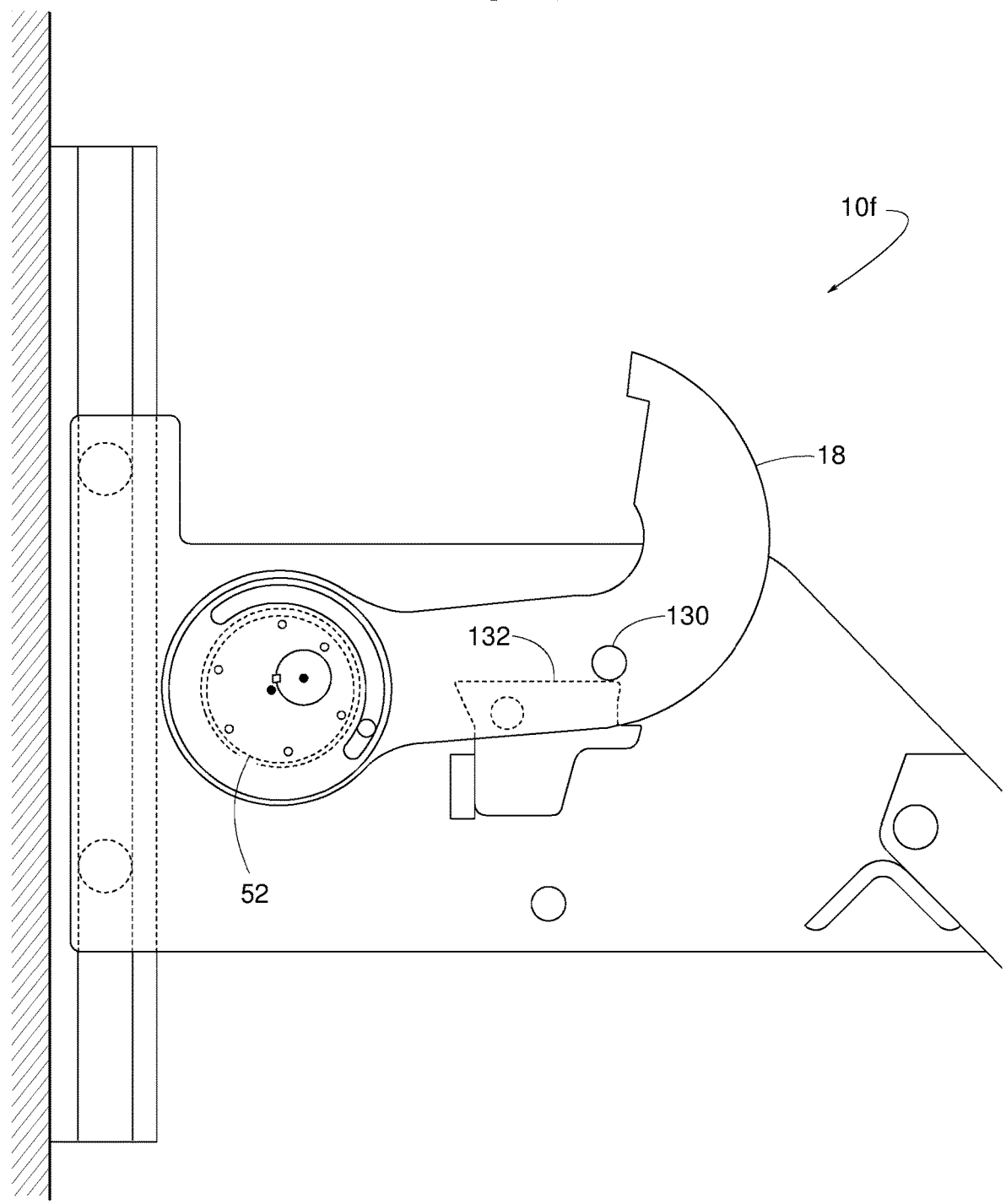
FIG. 24 is a side view similar to FIG. 22 but showing the example barrier in a second deployed position.
Figure 25:
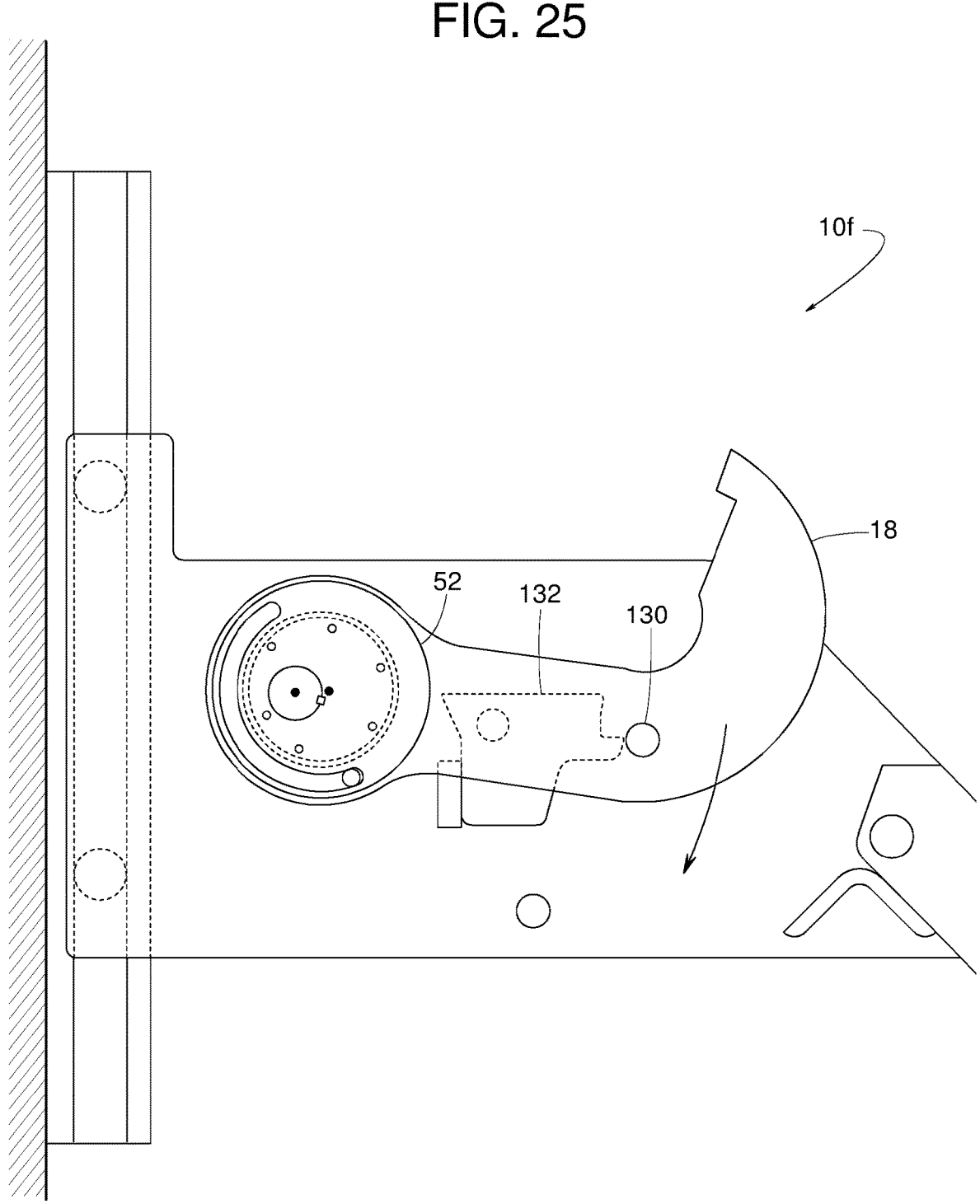
FIG. 25 is a side view similar to FIG. 22 but showing the example barrier in a third deployed position.
Figure 26:
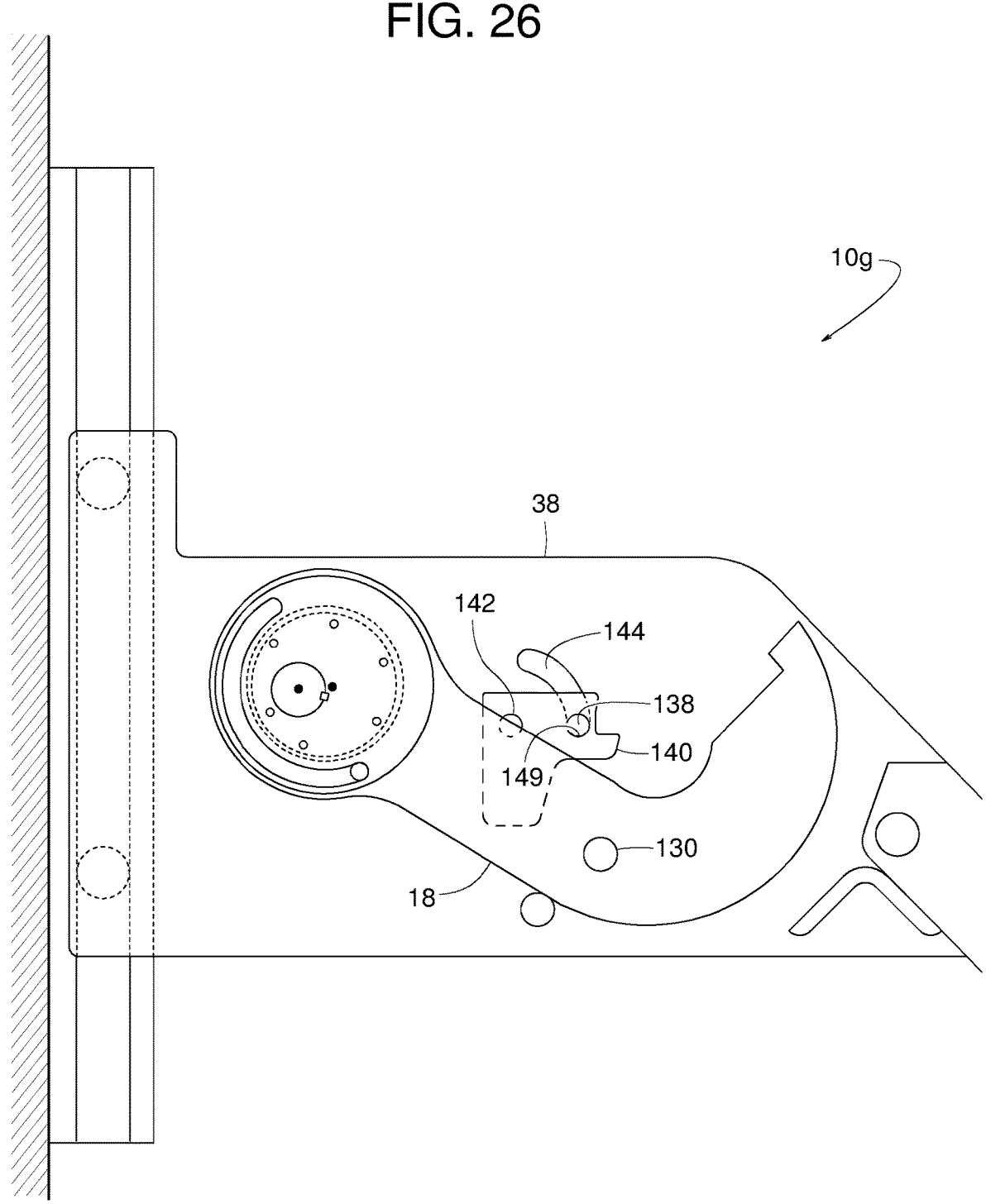
FIG. 26 is a side view of another example vehicle restraint disclosed herein with an example barrier of the vehicle restraint shown in a first stored position, where a carriage panel is omitted to more clearly show other parts of the vehicle restraint.
Figure 27:
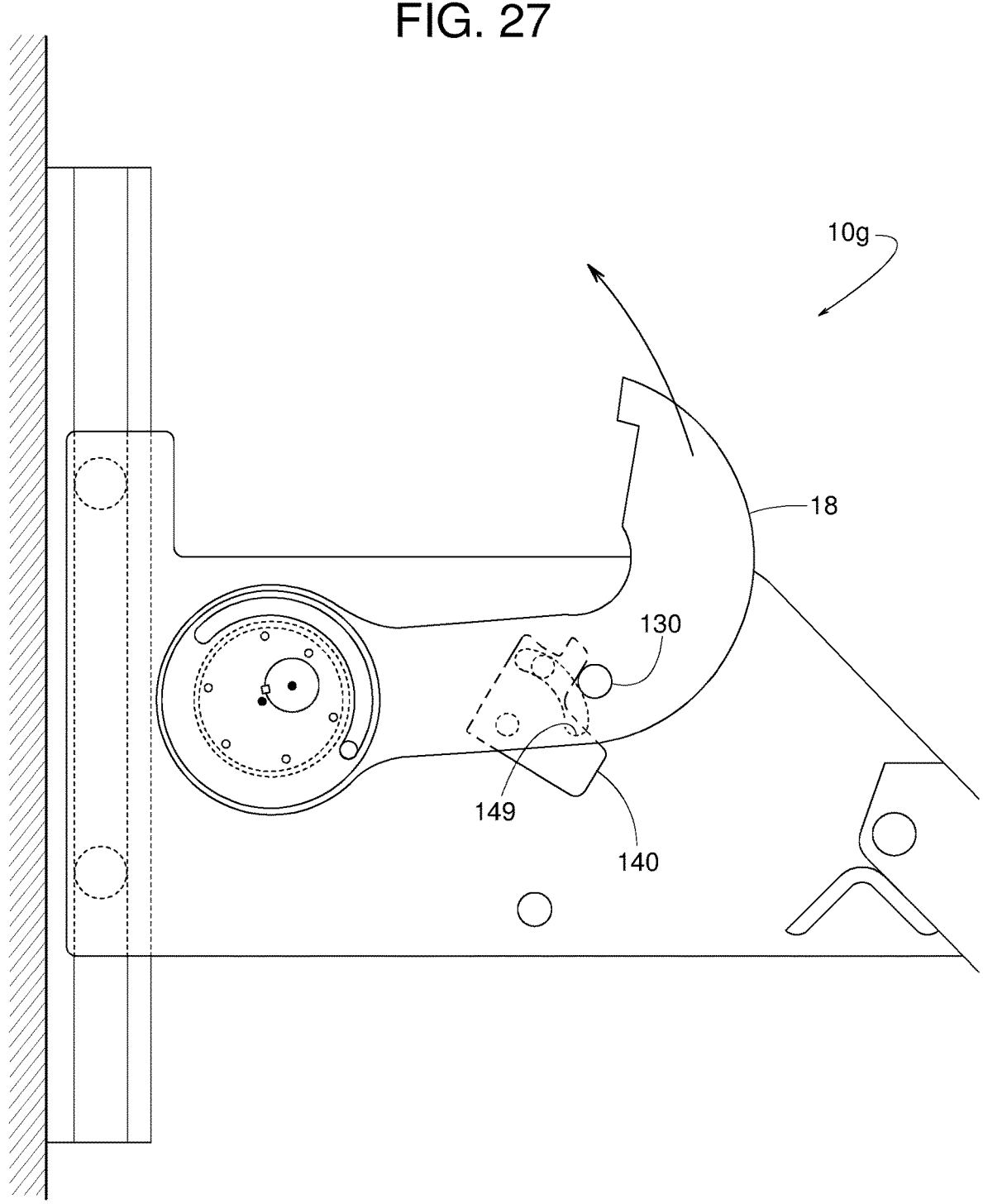
FIG. 27 is a side view similar to FIG. 26 but showing the example barrier in a first deployed position.
Figure 28:
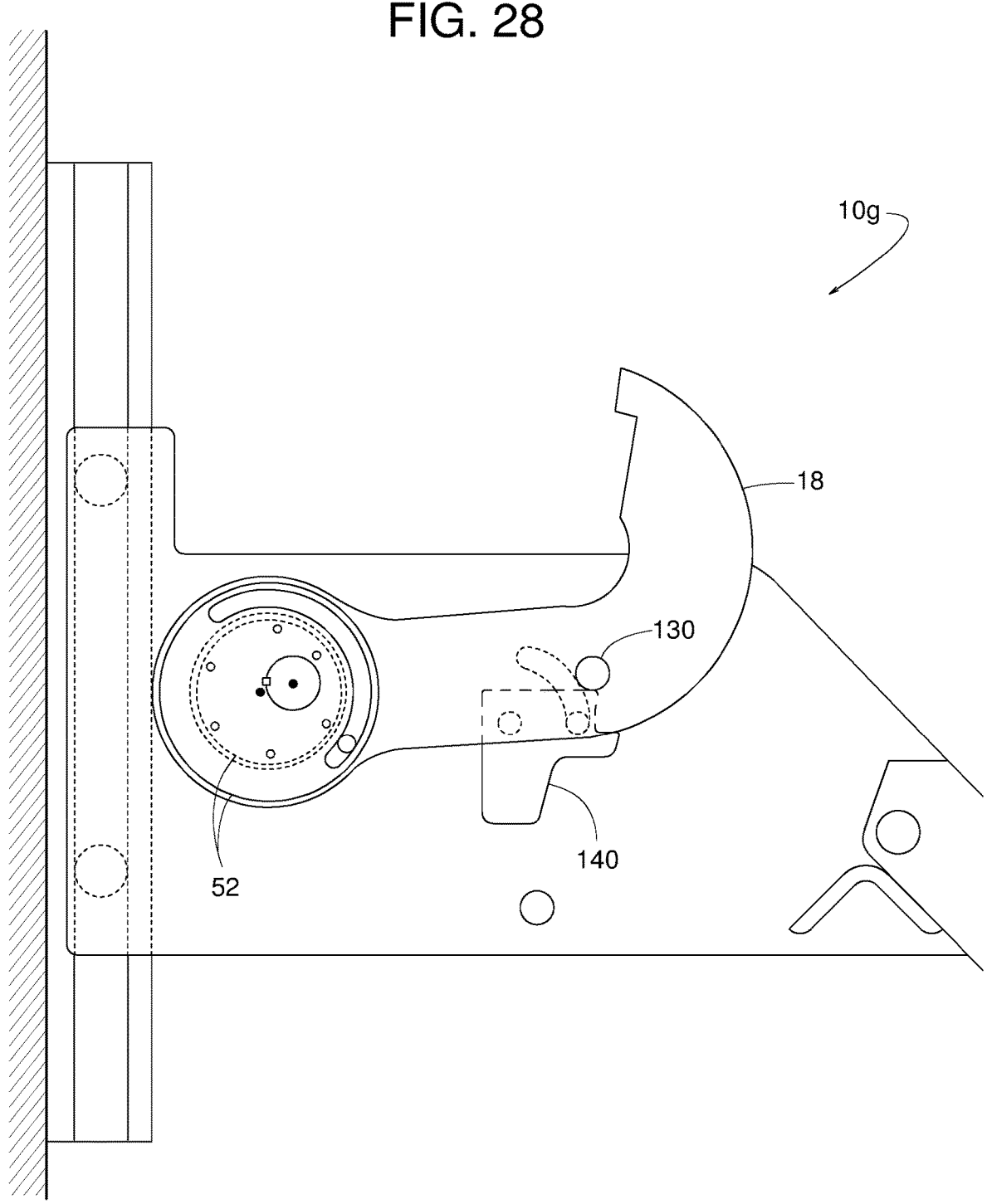
FIG. 28 is a side view similar to FIG. 26 but showing the example barrier in a second deployed position.
Figure 29:
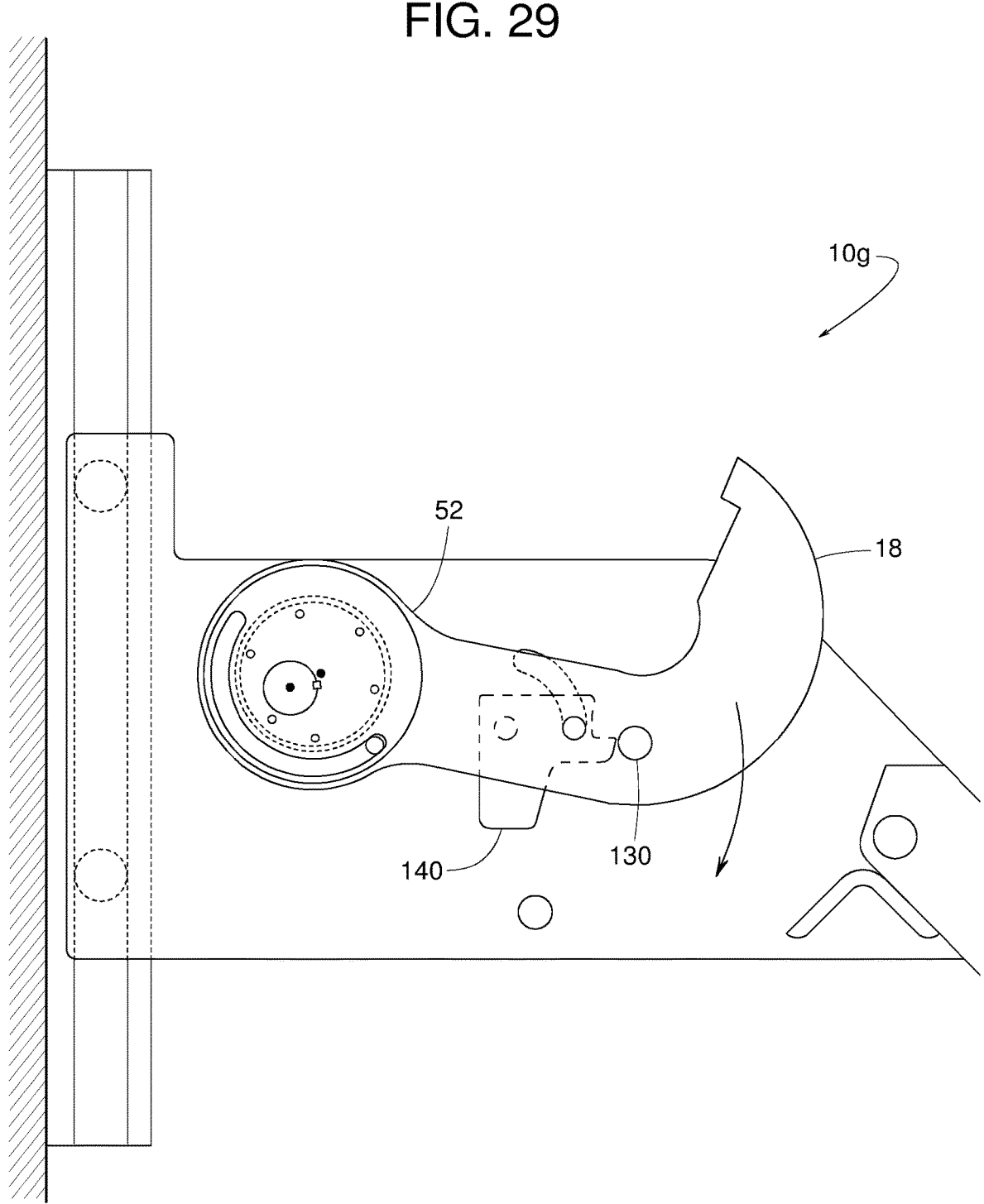
FIG. 29 is a side view similar to FIG. 26 but showing the example barrier in a third deployed position.
Figure 30:
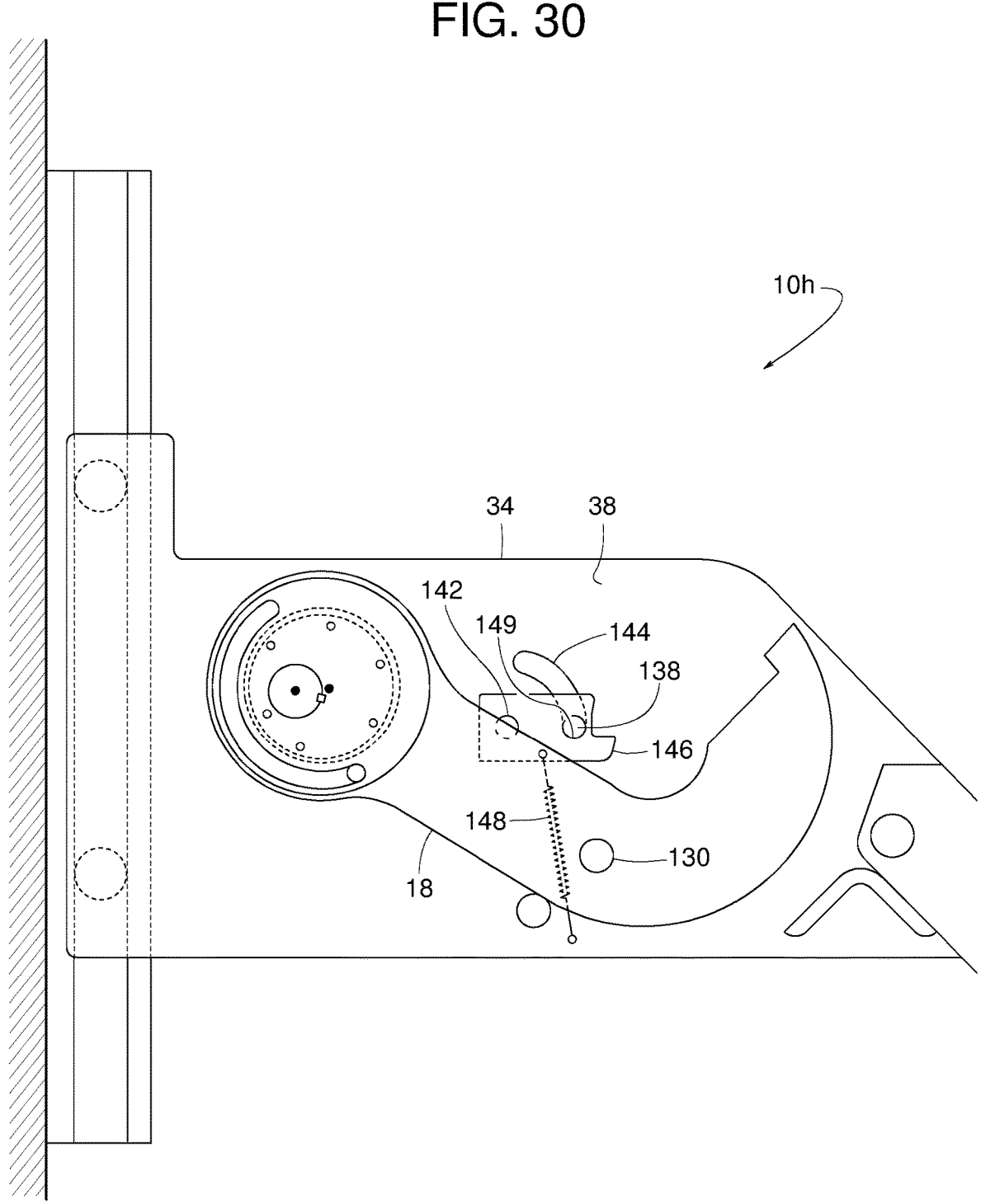
FIG. 30 is a side view of another example vehicle restraint disclosed herein with an example barrier of the vehicle restraint shown in a first stored position, where a carriage panel is omitted to more clearly show other parts of the vehicle restraint.
Figure 31:
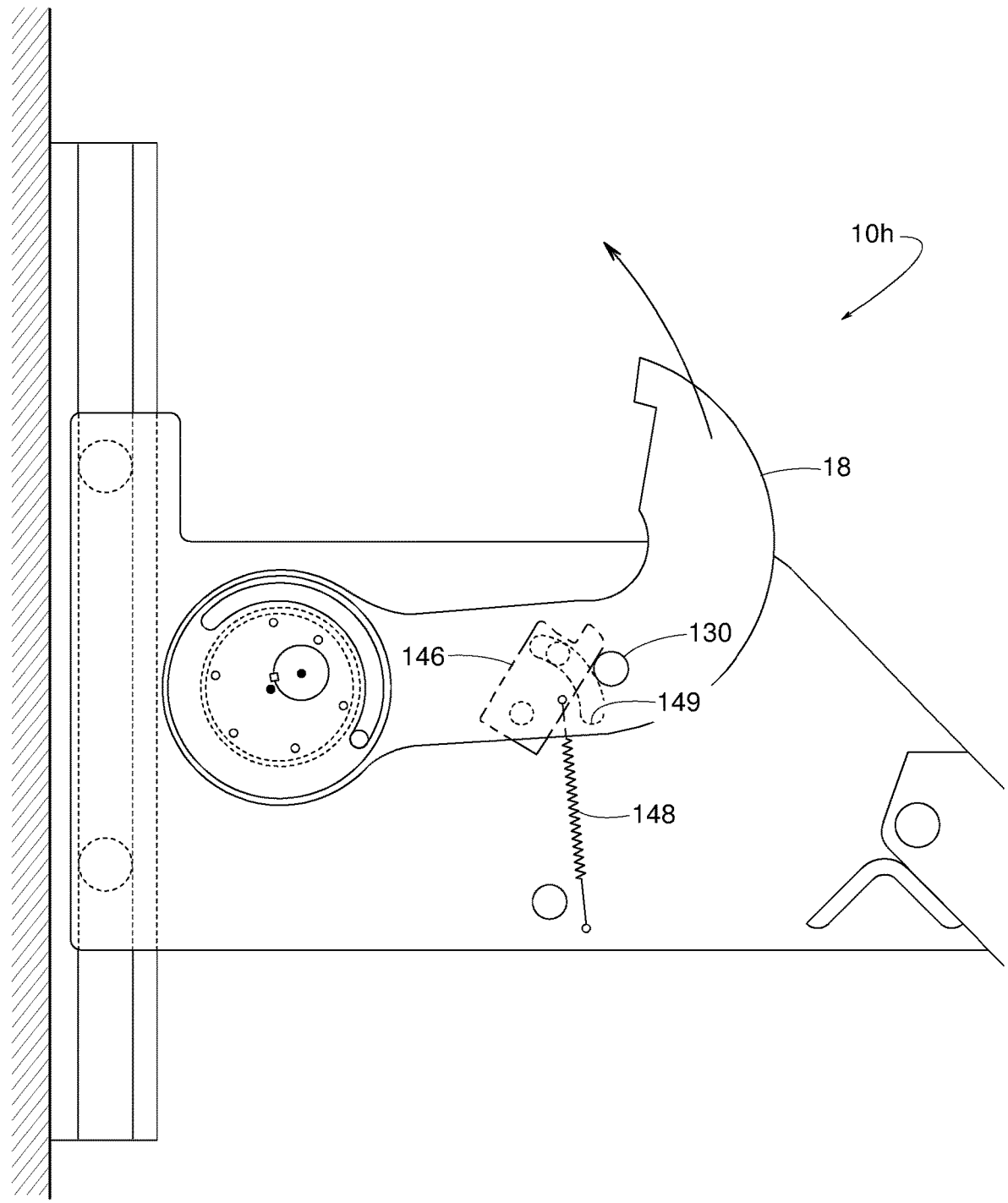
FIG. 31 is a side view similar to FIG. 30 but showing the example barrier in a first deployed position.
Figure 32:
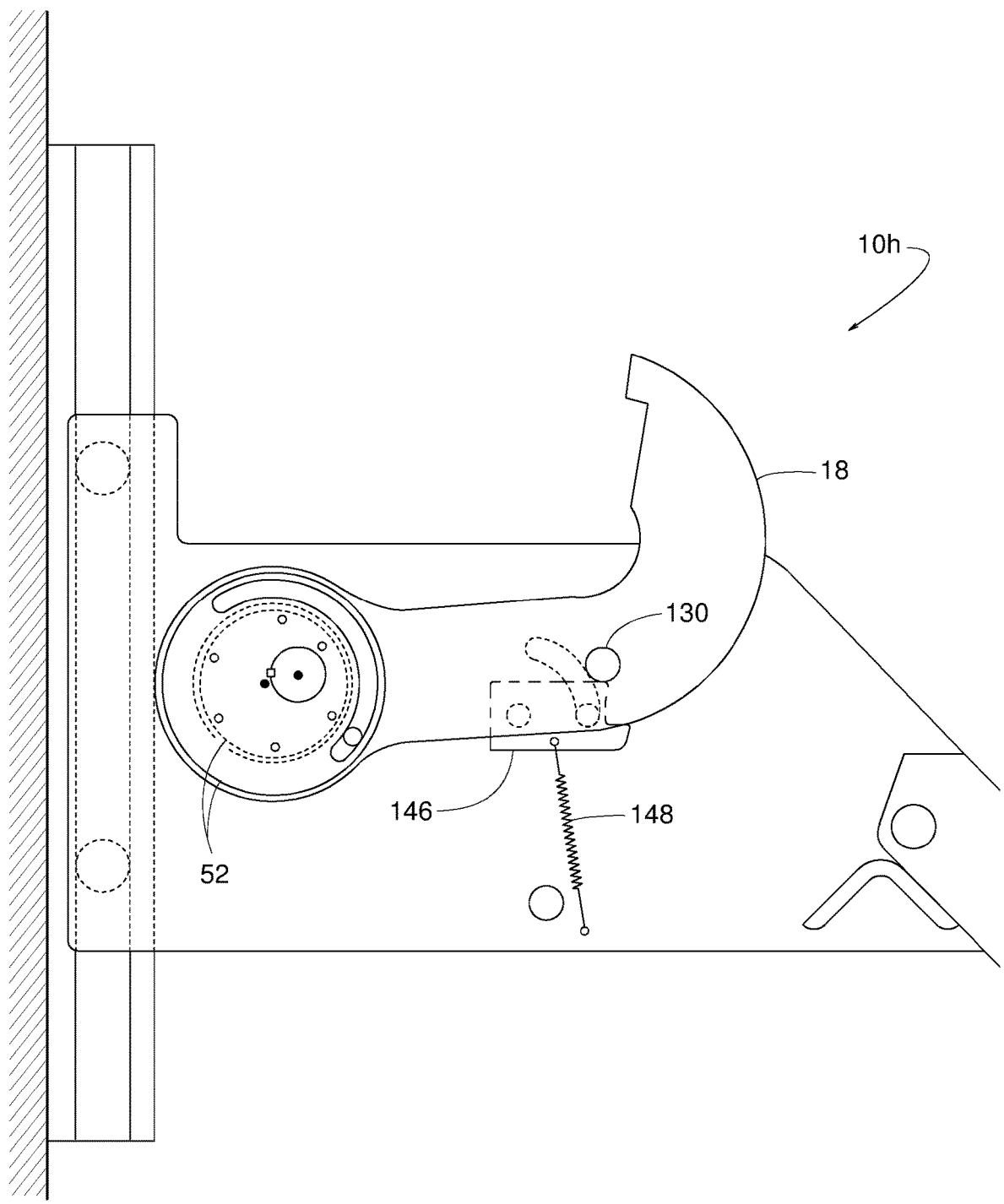
FIG. 32 is a side view similar to FIG. 30 but showing the example barrier in a second deployed position.
Figure 33:
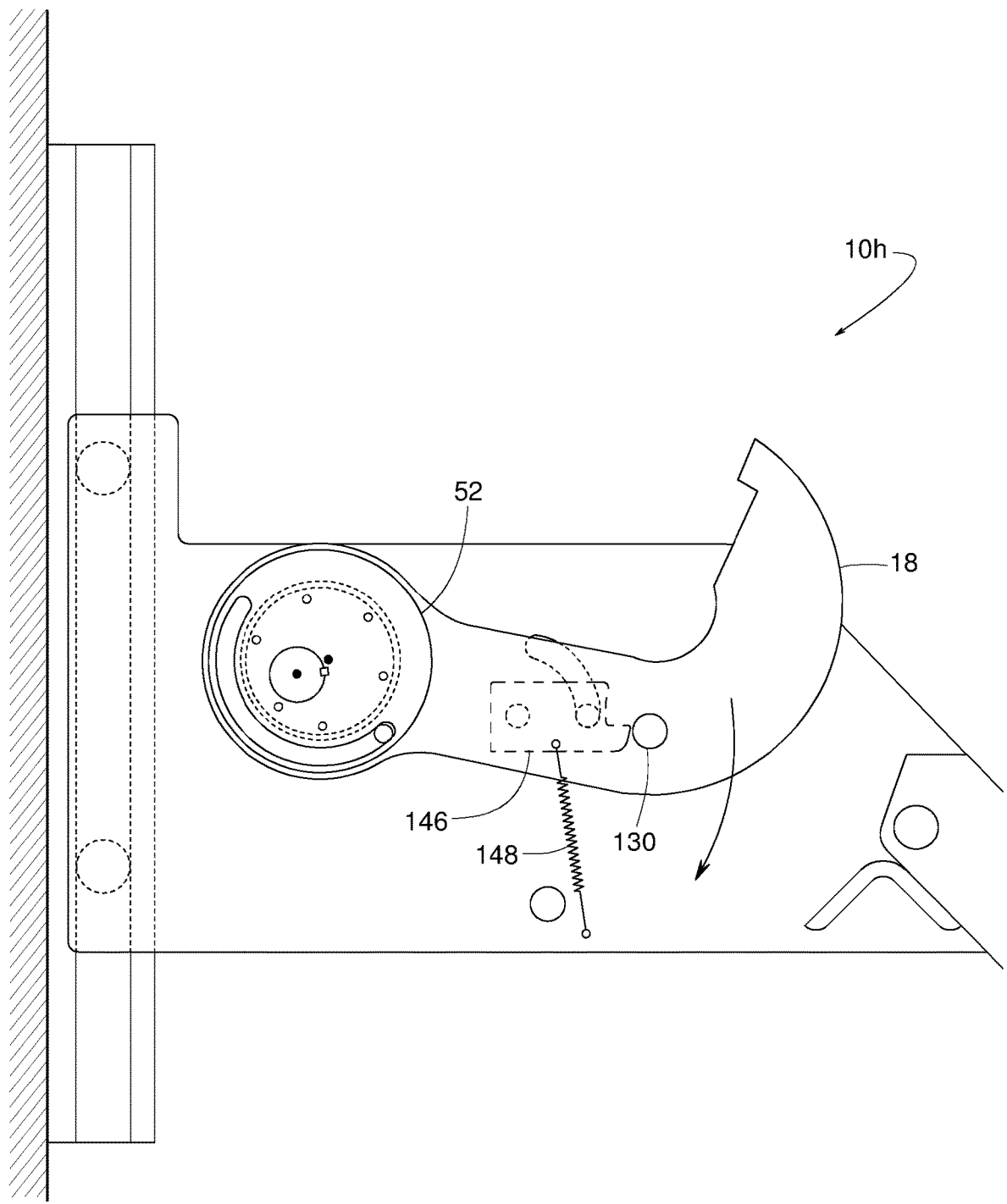
FIG. 33 is a side view similar to FIG. 30 but showing the example barrier in a third deployed position.

In operation, FIGS. 22, 26, and 30 correspond to FIG. 4, where barrier 18 is in the rotationally stored and laterally extended position. FIGS. 23, 27, and 31 correspond to FIG. 6, where the rocker member 132, 140, 146 is tipping back away from the catch 136, 149 in response to retracted barrier 18 rotating upward (counterclockwise). FIGS. 24, 28, and 32 correspond to FIG. 10, where retracted barrier 18 has descended to the partially raised, deployed position in which the stop member 130 rests atop the rocker member 132, 140, 146 to prevent the barrier 18 from further descent until the drive unit is engaged to rotate the hub 52 clockwise. FIGS. 25, 29, and 33 corresponds to FIG. 13, where the rotation of the hub 52 has shifted the barrier 18 toward the laterally extended position to disengage the stop member 130 from the rocker member 132, 140, 146 to enable the barrier 18 to descend freely by gravity to the rotationally stored position.

Figure 34:
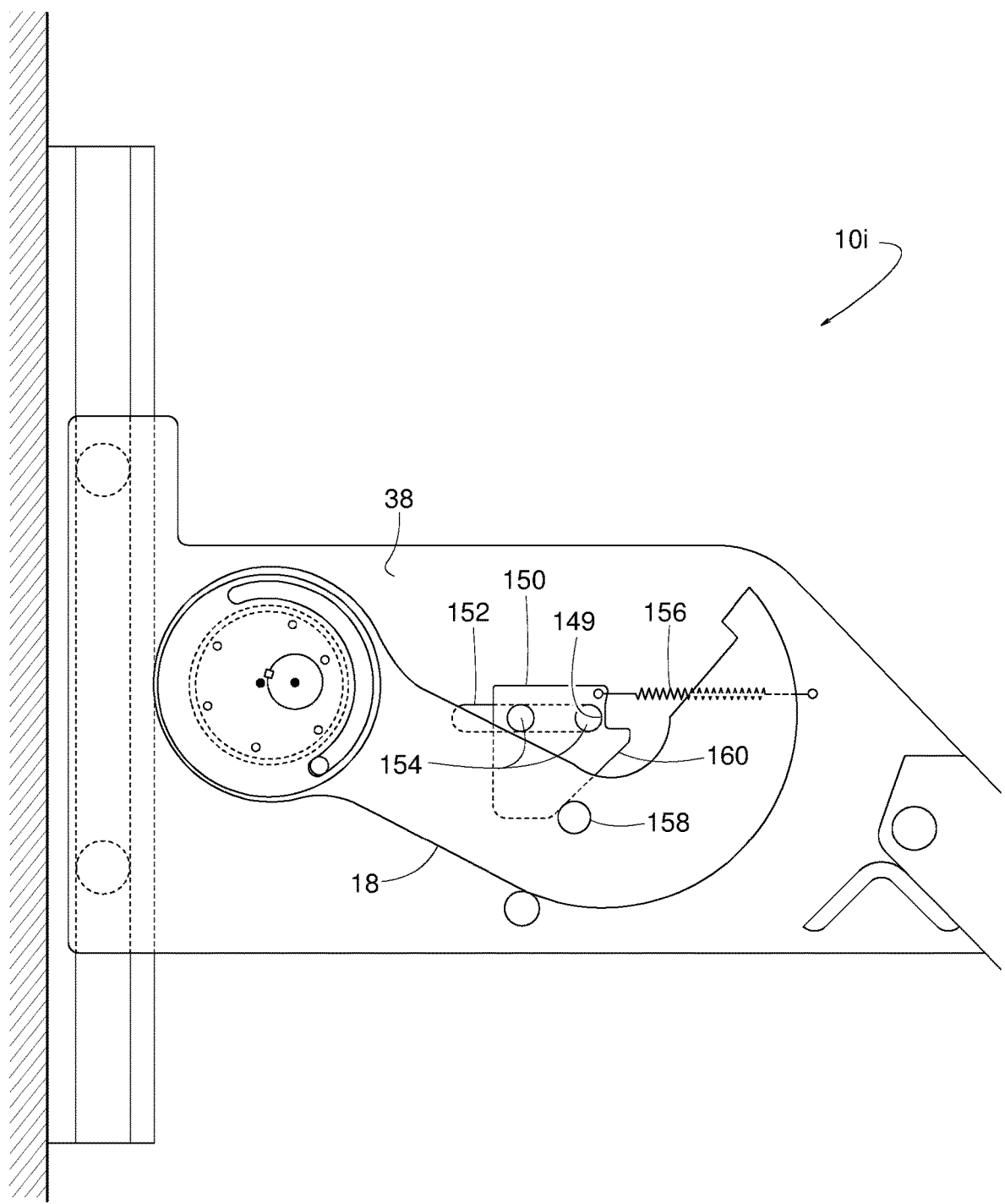
FIG. 34 is a side view of another example vehicle restraint disclosed herein with an example barrier of the vehicle restraint shown in an example first stored position, where a carriage panel is omitted to more clearly show other parts of the vehicle restraint.
Figure 35:
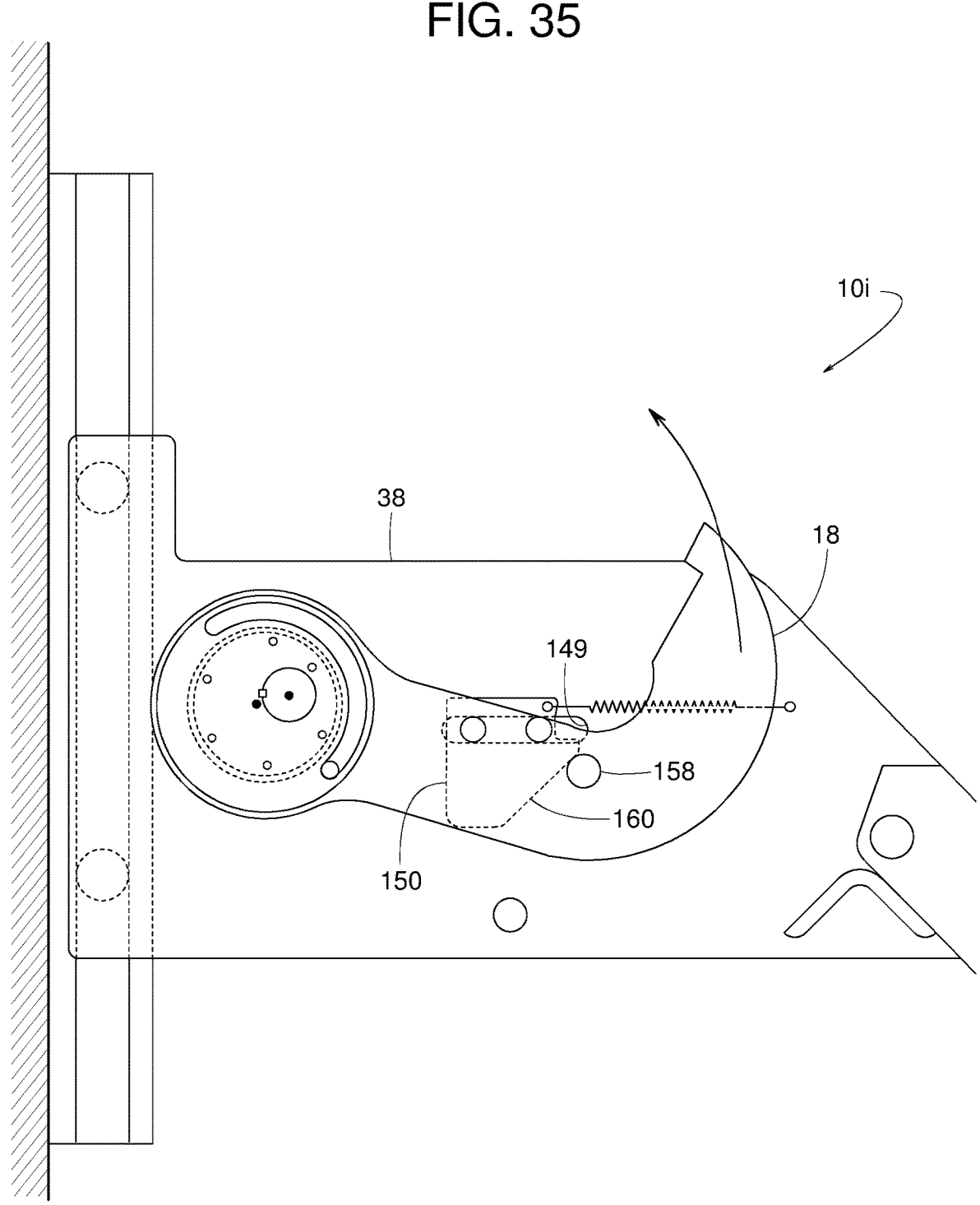
FIG. 35 is a side view similar to FIG. 34 but showing the example barrier in a first deployed position.

Example vehicle restraint 10*i*, shown in FIGS. 34-37 is similar to the vehicle restraint 10*h*. However, instead of the rocker member 146 rotating about the pin 142, a rocker member 150 translates between a forward position (FIG. 34) and a rearward position (FIG. 35). In this example, the rocker assembly includes the rocker member 150, guiding pins 154, and a spring 156. A slot 152 in panel 38 provides a linear track for the guiding pins 154 that project radially outward from the rocker member 150. A biasing element 156 urges the rocker member 150 toward the forward position. The catch 149 provides a stop to prevent movement of the rocker member 150 past the forward position. In the illustrated example, the biasing element 156 is an extension spring. However, in other examples, the biasing element 156 could be a torsion spring, a compression spring, a counter weight mechanism, etc.

Figure 36:
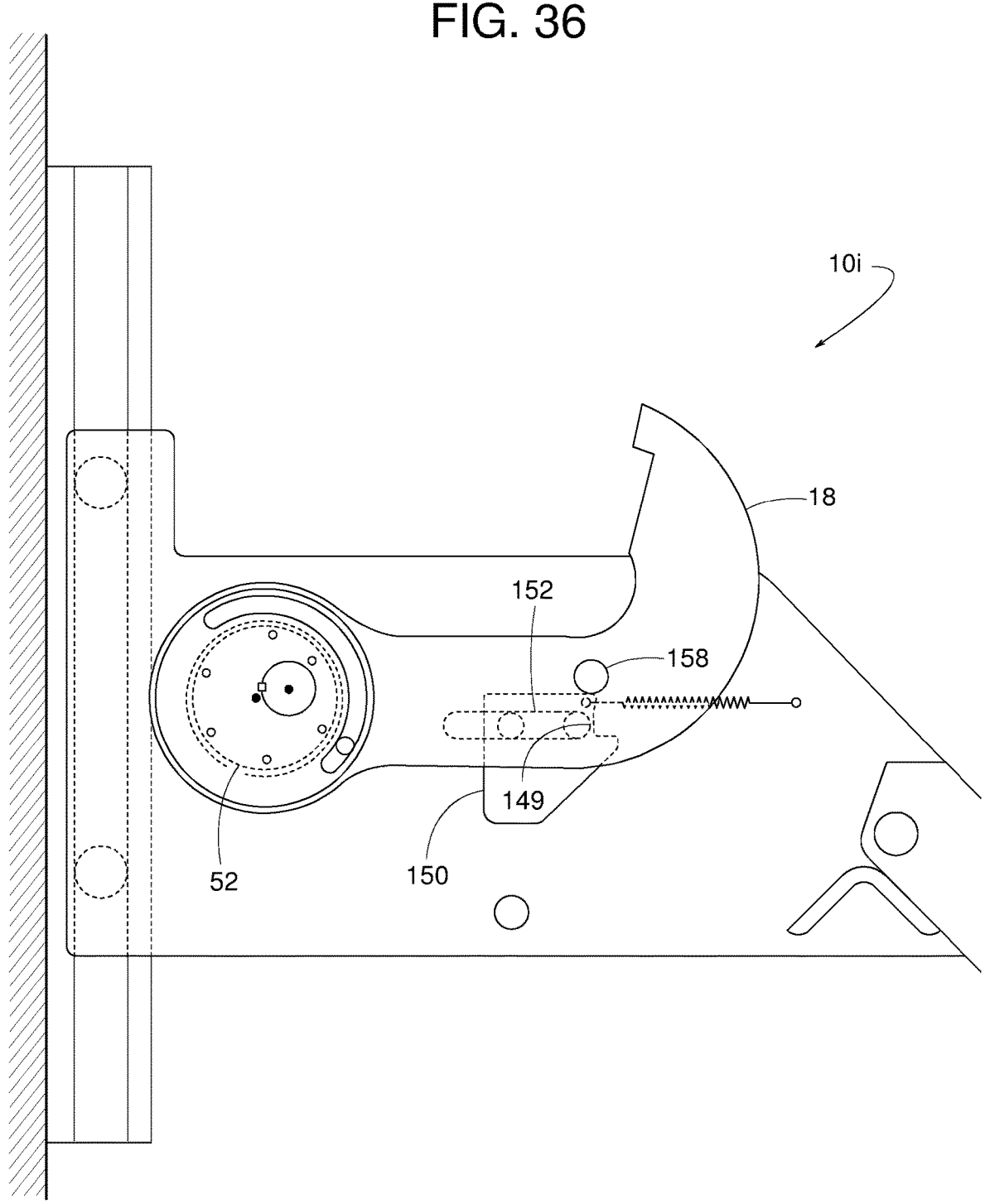
FIG. 36 is a side view similar to FIG. 34 but showing the example barrier in a second deployed position.
Figure 37:
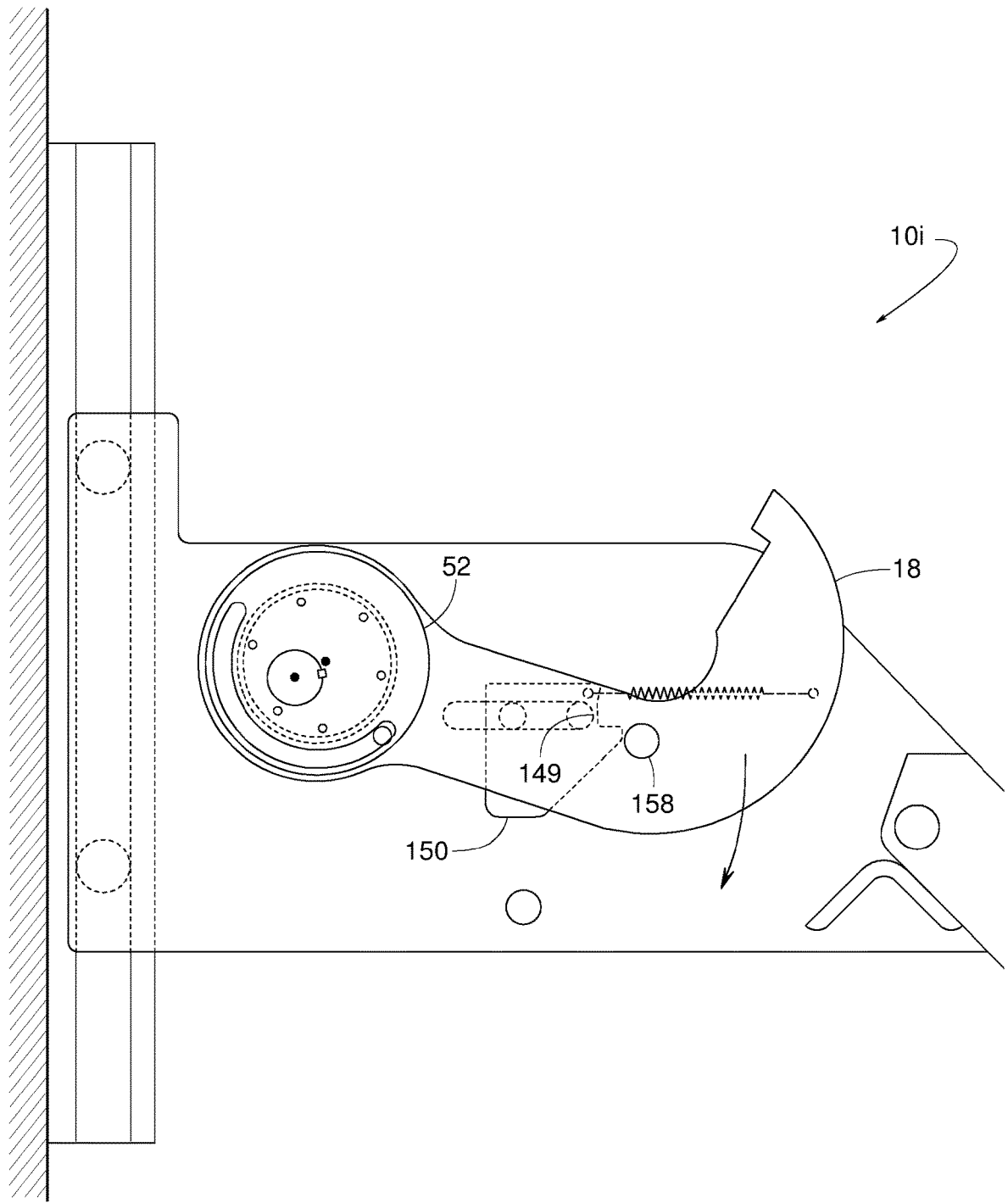
FIG. 37 is a side view similar to FIG. 34 but showing the example barrier in a third deployed position.

In operation, FIG. 34 corresponds to FIG. 5, where the barrier 18 is in the rotationally stored and laterally retracted position. FIG. 35 corresponds to FIG. 6, where the rocker member 150 is shifted rearward in response to retracted barrier 18 rotating upward (counterclockwise). The retracted barrier 18 rotating upward forces a stop member 158 on barrier 18 to slide along a cam surface 160 on the rocker member 150. The stop member 158 slides along the cam surface 160 to push the rocker member 150 away from the catch 149 toward the rearward position. FIG. 36 corresponds to FIG. 10, where the barrier 18 has descended to the partially raised, deployed position in which the stop member 158 rests atop the rocker member 150 to prevent the barrier 18 from further descent until the drive unit is engaged to rotate the hub 52 clockwise. FIG. 37 corresponds to FIG. 13, where rotation of the hub 52 has shifted the barrier 18 toward the laterally extended position to disengage the stop member 158 from the rocker member 150 and enable the barrier 18 to descend freely by gravity to the rotationally stored position.

Although only one rocker assembly is shown connecting the barrier 18 to the second panel 38 of the carriage frame 34 in the example of FIGS. 17-38, some examples of the vehicle restraints 10*b-i* include a second rocker assembly connecting the mirrored side of the barrier 18 to the first panel 36. Similarly, although only one lifting assembly is shown connecting the hub 52 to the barrier 18 in the example of FIGS. 17-38, some examples of the vehicle restraints 10*b-i* include a second lifting assembly connecting the mirrored side of the hub 52 to the mirrored side of the barrier 18.

Figure 38:
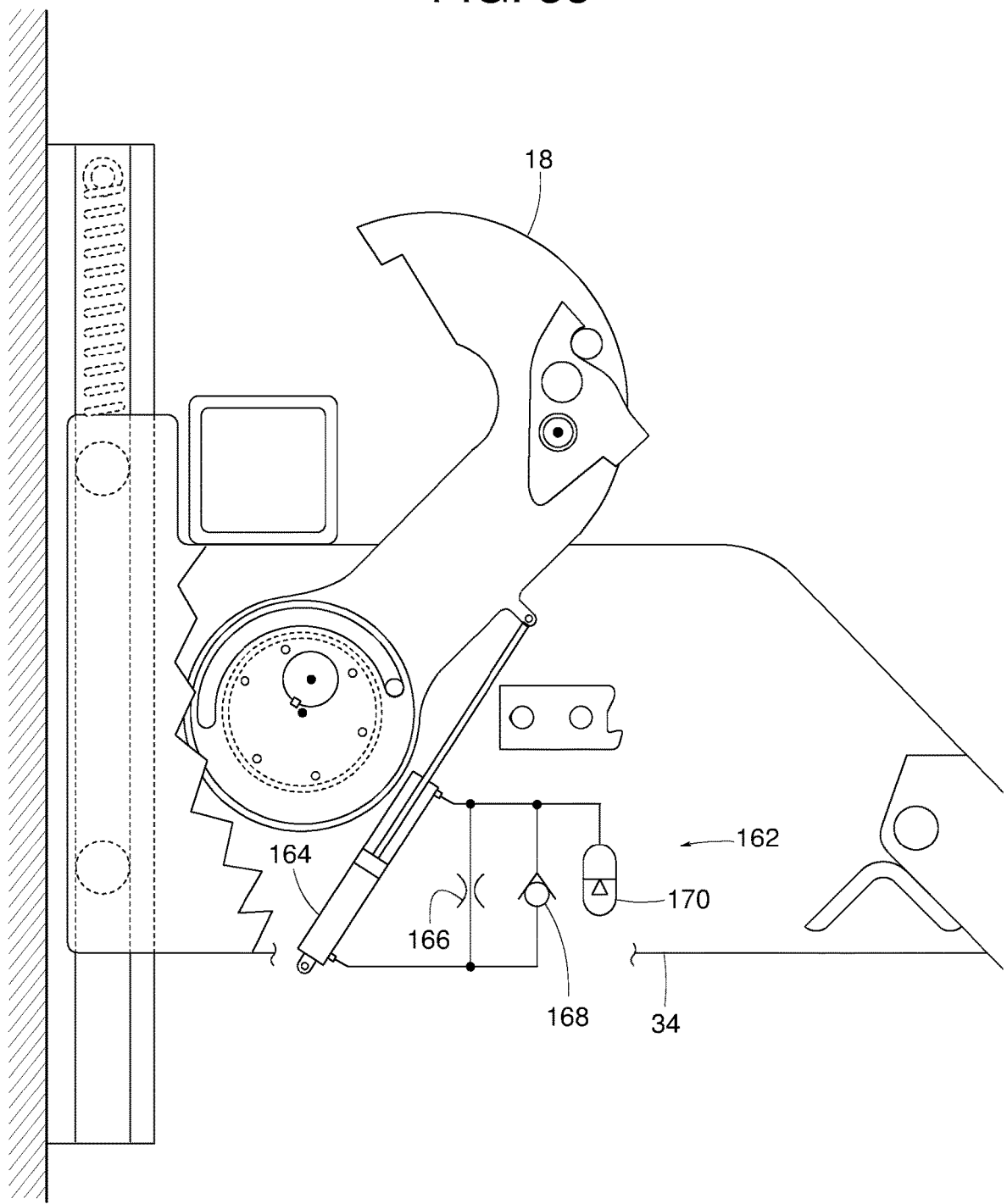
FIG. 38 is a side view similar to FIG. 19 but showing another example vehicle restraint disclosed herein.

The example vehicle restraint shown in FIG. 38 is similar to the one shown in FIG. 19, however, the gas spring 118 has been replaced by a shock absorber system 162 including a hydraulic cylinder 164, a flow restriction 166, a check valve 168 and an accumulator 170. The flow restriction 166 slows the retraction of the cylinder 164 and, thus, slows the descent of the barrier 18. The check valve 168 bypasses the flow restriction 166 during extension (e.g., an extension stroke) of the cylinder 164, so an ascent of the barrier 18 is substantially unrestricted (e.g., from the flow restriction 166). The accumulator 170 compensates for the cylinder 164 having less fluid holding capacity on the cylinder's rod end than on the piston end (due to the fluid displaced by (e.g., a volume of) a piston rod located inside the cylinder 164).

From the foregoing, it will be appreciated that example methods, apparatus and articles of manufacture have been disclosed that provide one or more benefits including more positive motion, sturdier construction, smoother operation, less susceptible to dirt and other contaminants, less jarring impacts, and less susceptible to adverse rotational inertia.

At least some of the aforementioned examples include one or more features and/or benefits including, but not limited to, the following:

In some examples, a vehicle restraint includes a carriage frame movable vertically relative to the dock. A drive shaft is supported by the carriage frame. A drive unit is to rotate the drive shaft about a shaft axis and relative to the carriage frame. A hub is connected to rotate with the drive shaft about the shaft axis, the hub having an outer diameter surface that is radially off center relative to the shaft axis. A barrier defines a bore that encircles the outer diameter surface of the hub. The barrier is movable selectively to an extended position and a retracted position. The barrier being connected to move selectively to the extended position and the retracted position in response to relative rotation between the outer diameter surface of the hub and the bore of the barrier. A lifter is borne by the hub and an abutment is borne by the barrier. The lifter is in selective engagement and disengagement with the abutment such that the lifter is to move the barrier rotationally upward when the lifter is in engagement with the abutment. A stop member is borne by the carriage frame and a catch is borne by the barrier. A rocker member is coupled to the barrier and connected to rotate about a rocker axis relative to the barrier, the rocker member being connected to rotate selectively to a forward tilted position and a rearward tilted position relative to the barrier. The rocker member is in a first engaged relationship with the catch when the rocker member is in the forward tilted position. The rocker member is in a second engaged relationship with the catch when the rocker member is in the rearward tilted position. The rocker member is configured to selectively engage and disengage the stop member. The barrier has a longitudinal axis intersecting and lying perpendicular to the shaft axis and the rocker axis. The barrier is movable relative to the carriage to selectively position the longitudinal axis at an angular position lying rotationally between an imaginary horizontal plane and an imaginary vertical plane. The rocker member is configured to have a center of gravity situated such that when the rocker member is in the rearward tilted position the center of gravity urges the rocker member toward the forward tilted position when the longitudinal axis is at an angle greater than 35 degrees from horizontal.

In some examples, the rocker member defines a cavity spaced apart from the rocker axis to ensure that the center of gravity of the rocker member is positioned to urge the rocker member toward the forward tilted position when the longitudinal axis is at the angle greater than 35 degrees from horizontal.

In some examples, a bias element is connected to the rocker member to urge the rocker member toward the forward tilted position.

In some examples, a vehicle restraint includes one of a bushing and a bearing interposed between the outer diameter surface of the hub and the bore of the barrier In some examples, the bearing is a rolling-element bearing In some examples, a vehicle restraint includes one of a bushing and a bearing to couple the rocker member to the barrier.

In some examples, the bearing is a rolling-element bearing.

In some examples, the carriage frame includes a first panel and a second panel that are spaced apart in an axial direction to define a space therebetween, the vehicle restraint further including a standoff attached to the first panel and protruding into the space to inhibit the barrier and the rocker member from moving in the axial direction against the first panel.

In some examples, the standoff is an integral part of the stop member.

In some examples, wherein the hub further includes an outermost perimeter extending radially beyond the outer diameter surface of the hub, and the abutment borne by the barrier extends radially outward substantially as far as the outermost perimeter of the hub.

In some examples, wherein the abutment borne by the barrier extends radially outward at least as far as the outermost perimeter of the hub.

In some examples, a vehicle restraint includes a drive shaft supported by a carriage frame. A drive unit rotates the drive shaft about a shaft axis and relative to the carriage frame. A hub is connected to rotate with the drive shaft about the shaft axis, the hub having an outer diameter surface that is radially off center relative to the shaft axis. A barrier defines a bore that encircles the outer diameter surface of the hub, the barrier being movable selectively to an extended position and a retracted position relative to the drive shaft. The barrier is connected to move selectively to the extended position and the retracted position in response to relative rotation between the outer diameter surface of the hub and the bore of the barrier. A lifter is borne by the hub. An abutment is borne by the barrier. The lifter is movable in engagement with and disengagement from the abutment. The lifter to move the barrier rotationally upward when the lifter is in engagement with the abutment. A stop member is borne by the barrier. A rocker member is coupled to the carriage frame. The rocker member includes an upper facing surface and a lower facing surface. The rocker member is connected to move selectively to a forward position and a rearward position relative to the carriage frame. The rocker member is configured to move between the forward position and the rearward position in response to the upward movement of the barrier causing engagement between the stop member and the lower facing surface of the rocker member. The rocker member is further configured to inhibit downward movement of the barrier when the stop member is in engagement with the upper facing surface of the rocker member.

In some examples, the carriage frame further includes a catch, the rocker member being in engagement with the catch when the rocker member is in the forward position, the rocker member being disengaged from the catch when the rocker member is in the rearward position.

In some examples, the carriage frame provides a curved track that is in guiding relationship with the rocker member.

In some examples, the carriage frame provides a substantially linear track that is in guiding relationship with the rocker member.

In some examples, the vehicle restraint includes a spring connected to urge the rocker member toward the forward position.

In some examples, a vehicle restraint includes one of a bushing and a bearing interposed between the outer diameter surface of the hub and the bore of the barrier.

In some examples, the bearing is a rolling-element bearing

In some examples, the vehicle restraint includes one of a bushing and a bearing to couple the rocker member to the carriage frame.

In some examples, the carriage frame includes a first panel and a second panel that are spaced apart in an axial direction to define a space therebetween. The vehicle restraint includes a standoff attached to the first panel and protruding into the space to inhibit the barrier from moving in the axial direction against the rocker member.

In some examples, the hub includes an outermost perimeter extending radially beyond the outer diameter surface of the hub. The abutment may be borne by the barrier extends radially outward substantially as far as the outermost perimeter of the hub.

In some examples, the abutment borne by the barrier extends radially outward at least as far as the outermost perimeter of the hub.

In some examples, a vehicle restraint includes a carriage frame movable vertically relative to the dock. A drive shaft is supported by the carriage frame. A drive unit is connected to rotate the drive shaft about a shaft axis and relative to the carriage frame. A hub is connected to rotate with the drive shaft about the shaft axis. The hub has an outer diameter surface that is radially off center relative to the shaft axis. A barrier defines a bore that encircles the outer diameter surface of the hub. The barrier is movable selectively to an extended position and a retracted position relative to the drive shaft. The barrier is connected to move selectively to the extended position and the retracted position in response to relative rotation between the outer diameter surface of the hub and the bore of the barrier. A lifter is borne by the hub. An abutment is borne by the barrier. The lifter is in selective engagement and disengagement with the abutment. The lifter is positioned to move the barrier rotationally upward when the lifter is in engagement with the abutment. The barrier is moveable relative to the carriage frame to a raised blocking position in response to rotation of the hub while the lifter is in engagement with the abutment, and to a stored release position in response to gravity urging the barrier down while the lifter is disengaged from the abutment. A bias element couples the barrier to the carriage frame to urge the barrier toward the raised blocking position relative to the carriage frame, the bias element being insufficient to fully overcome gravity urging the barrier toward the stored release position.

In some examples, the bias element is a helical extension spring.

In some examples, the bias element is a gas spring.

In some examples, the hub further includes an outermost perimeter extending radially beyond the outer diameter surface of the hub, and the abutment borne by the barrier extends radially outward substantially as far as the outermost perimeter of the hub.

In some examples, the abutment borne by the barrier extends radially outward at least as far as the outermost perimeter of the hub.

In some examples, a vehicle restraint includes a shock absorber borne by at least one of the lifter and the abutment.

In some examples, the shock absorber includes a spring.

In some examples, the shock absorber includes a polymeric material.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A vehicle restraint to selectively block and release a vehicle at a dock, the vehicle restraint comprising:
a carriage frame including a first panel and a second panel that are spaced apart in an axial direction to define a space therebetween;
a drive shaft supported by the carriage frame;
a drive unit to rotate the drive shaft about a shaft axis and relative to the carriage frame;
a hub connected to rotate with the drive shaft about the shaft axis, the hub having a central axis that is radially off center relative to the shaft axis;
a barrier defining a bore to receive the hub, the barrier positioned within the space formed between the first panel and the second panel of the carriage frame, the barrier being movable relative to the carriage frame between an extended position and a retracted position in response to relative rotation between the hub and the barrier;
a lifter borne by the hub;
an abutment borne by the barrier, the lifter being movable in engagement with and disengagement from the abutment, the lifter to move the barrier rotationally upward when the lifter is in engagement with the abutment;
a stop supported by the barrier; and
a rocker supported by and movably coupled to at least one of the first panel or the second panel of the carriage frame such that the rocker remains within the space formed between the first panel and the second panel when the barrier is extended, the rocker including an upper facing surface and a lower facing surface, the rocker configured to move between a forward position and a rearward position relative to the carriage frame in response to upward movement of the barrier and engagement between the stop and the lower facing surface of the rocker, the rocker being configured to inhibit downward movement of the barrier when the stop is in engagement with the upper facing surface of the rocker, the stop of the barrier configured to disengage the rocker in response to the barrier moving to the extended position.

2. The vehicle restraint of claim 1, the vehicle restraint further including a standoff attached to the first panel and protruding into the space to inhibit the barrier and the rocker from moving in the axial direction against the first panel.

3. The vehicle restraint of claim 2, wherein the standoff is an integral part of the stop.

4. The vehicle restraint of claim 1, wherein the carriage frame further comprises a catch, the rocker being in engagement with the catch when the rocker is in the forward position, the rocker being disengaged from the catch when the rocker is in the rearward position.

5. The vehicle restraint of claim 1, wherein the carriage frame provides a curved track that is in guiding relationship with the rocker.

6. The vehicle restraint of claim 1, wherein the carriage frame provides a substantially linear track that is in guiding relationship with the rocker.

7. The vehicle restraint of claim 1, further including a spring connected to urge the rocker toward the forward position.

8. The vehicle restraint of claim 1, further including one of a bushing and a bearing interposed between an outer diameter surface of the hub and the bore of the barrier.

9. The vehicle restraint of claim 8, wherein the bearing is a rolling-element bearing.

10. The vehicle restraint of claim 1, further including one of a bushing and a bearing to couple the rocker to the carriage frame.

11. The vehicle restraint of claim 1, wherein the vehicle restraint further includes a standoff attached to at least one of the first panel or the second panel and protruding into the space to inhibit the barrier from moving in the axial direction against the rocker.

12. The vehicle restraint of claim 1, wherein the hub further includes an outermost perimeter extending radially beyond an outer diameter surface of the hub, and the abutment borne by the barrier extends radially outward substantially as far as the outermost perimeter of the hub.

13. The vehicle restraint of claim 12, wherein the abutment borne by the barrier extends radially outward at least as far as the outermost perimeter of the hub.

14. The vehicle restraint of claim 1, wherein the stop of the barrier protrudes from a side surface of the barrier.

15. The vehicle restraint of claim 14, wherein the rocker is pivotally coupled to the carriage frame.

16. The vehicle restraint of claim 15, further including a catch attached to the carriage frame, the catch to prevent the rocker from pivoting relative to the rocker beyond a first pivot position in a first pivotal direction about a pivot axis of the rocker and beyond a second pivot position in a second pivotal direction about the pivot axis, the first pivotal direction being different than the second pivotal direction.

17. The vehicle restraint of claim 14, wherein at least one of the first panel or the second panel of the carriage frame includes a curved slot, and wherein the rocker is pivotally coupled to the carriage frame via a first pin and includes a second pin to engage the curved slot of the at least one of the first panel or the second panel.

18. The vehicle restraint of claim 1, wherein at least one of the first panel or the second panel of the carriage frame includes a linear track to receive and a guide pin of the rocker, wherein the rocker is configured to translate relative to the carriage frame via the guide pin and the linear track.

19. A vehicle restraint to selectively block and release a vehicle at a dock, the vehicle restraint comprising:
a carriage frame movable vertically relative to the dock;
a drive shaft supported by the carriage frame;
a drive unit connected to rotate the drive shaft about a shaft axis and relative to the carriage frame;
a hub connected to rotate with the drive shaft about the shaft axis, the hub having an outer diameter surface that is radially off center relative to the shaft axis;
a barrier defining a bore that encircles the outer diameter surface of the hub, the barrier being movable selectively to an extended position and a retracted position relative to the drive shaft, the barrier being connected to move selectively to the extended position and the retracted position in response to relative rotation between the outer diameter surface of the hub and the bore of the barrier;
a lifter borne by the hub;
an abutment borne by the barrier, the lifter being in selective engagement and disengagement with the abutment, the lifter being positioned to move the barrier rotationally upward when the lifter is in engagement with the abutment, the barrier moveable relative to the carriage frame to a raised blocking position in response to rotation of the hub while the lifter is in engagement with the abutment, and to a stored release position in response to gravity urging the barrier down while the lifter is disengaged from the abutment; and
a biasing element to couple the barrier and the carriage frame, the biasing element to urge the barrier toward the raised blocking position relative to the carriage frame, the bias element being insufficient to fully overcome gravity urging the barrier toward the stored release position.

20. The vehicle restraint of claim 19, wherein the bias element is a helical extension spring.

21. The vehicle restraint of claim 19, wherein the bias element is a gas spring.

22. The vehicle restraint of claim 19, wherein the hub further includes an outermost perimeter extending radially beyond the outer diameter surface of the hub, and the abutment borne by the barrier extends radially outward substantially as far as the outermost perimeter of the hub.

23. The vehicle restraint of claim 22, wherein the abutment borne by the barrier extends radially outward at least as far as the outermost perimeter of the hub.

24. The vehicle restraint of claim 19, further including a shock absorber borne by at least one of the lifter and the abutment.

25. The vehicle restraint of claim 24, wherein the shock absorber includes a spring.

26. The vehicle restraint of claim 24, wherein the shock absorber includes a polymeric material.

* * * * *